(12) United States Patent
Nagano

(10) Patent No.: US 11,924,546 B2
(45) Date of Patent: *Mar. 5, 2024

(54) RECEPTION APPARATUS AND TRANSMISSION APPARATUS

(71) Applicant: Sony Semiconductor Solutions Corporation, Kanagawa (JP)

(72) Inventor: Hirosuke Nagano, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,296

(22) Filed: Jan. 20, 2023

(65) Prior Publication Data

US 2023/0239570 A1 Jul. 27, 2023

Related U.S. Application Data

(63) Continuation of application No. 17/290,545, filed as application No. PCT/JP2019/045883 on Nov. 22, 2019, now Pat. No. 11,606,500.

(30) Foreign Application Priority Data

Dec. 6, 2018 (JP) ................ 2018-229200

(51) Int. Cl.
*H04N 23/667* (2023.01)
*H04N 23/73* (2023.01)
(52) U.S. Cl.
CPC ......... *H04N 23/667* (2023.01); *H04N 23/73* (2023.01)

(58) Field of Classification Search
None
See application file for complete search history.

(56) References Cited

U.S. PATENT DOCUMENTS

| 4,896,208 | A | * | 1/1990 | Moriya | H04N 1/3872 |
| | | | | | 358/452 |
| 9,241,120 | B2 | * | 1/2016 | Kishi | H04N 25/75 |
| 2004/0095477 | A1 | * | 5/2004 | Maki | H04N 19/14 |
| | | | | | 348/222.1 |
| 2007/0171298 | A1 | | 7/2007 | Kurane | |
| 2007/0229689 | A1 | | 10/2007 | Yamada | |

(Continued)

FOREIGN PATENT DOCUMENTS

| EP | 2869552 A1 | 5/2015 |
| JP | H11331643 A | 11/1999 |

(Continued)

OTHER PUBLICATIONS

International Search Report (PCT/ISA/210), International Application No. PCT/JP2019/045883, dated Dec. 13, 2019.

(Continued)

*Primary Examiner* — Cynthia Segura
(74) *Attorney, Agent, or Firm* — Michael Best & Friedrich LLP

(57) ABSTRACT

Provided is a reception apparatus that includes an information processing section configured to generate an image at least either in a first mode for reading out a whole captured region or in a second mode for reading out a partial region in the captured region. At the time of readout in the second mode, the image processing section varies a readout rate depending on the region.

20 Claims, 21 Drawing Sheets

(56) References Cited

U.S. PATENT DOCUMENTS

| | | | |
|---|---|---|---|
| 2009/0021621 A1* | 1/2009 | Hashimoto | H04N 25/587 |
| | | | 348/300 |
| 2011/0298961 A1* | 12/2011 | Yoshida | G03B 13/36 |
| | | | 348/E5.022 |
| 2012/0127327 A1 | 5/2012 | You | |
| 2015/0023429 A1* | 1/2015 | Narayanan | H04N 19/59 |
| | | | 375/240.24 |
| 2015/0208010 A1 | 7/2015 | Kim et al. | |
| 2016/0057332 A1 | 2/2016 | Ciurea et al. | |
| 2016/0065874 A1 | 3/2016 | Matsumura | |
| 2017/0366739 A1 | 12/2017 | Iwasaki | |
| 2019/0149751 A1 | 5/2019 | Wise | |
| 2019/0195262 A1 | 9/2019 | Nagori et al. | |
| 2019/0295262 A1* | 9/2019 | Nagori | G06T 7/246 |
| 2020/0186841 A1 | 6/2020 | Yoshimochi et al. | |
| 2020/0322616 A1* | 10/2020 | Sakomizu | H04N 19/85 |

FOREIGN PATENT DOCUMENTS

| | | |
|---|---|---|
| JP | 2001250119 A | 9/2001 |
| JP | 2002230544 A | 8/2002 |
| JP | 2006-109001 A | 4/2006 |
| JP | 2008160881 A | 7/2008 |
| JP | 2009027559 A | 2/2009 |
| JP | 2010200239 A | 9/2010 |
| JP | 2012-034099 A | 2/2012 |
| JP | 2012-120158 A | 6/2012 |
| JP | 2013-162443 A | 8/2013 |
| JP | 2016-054477 A | 4/2016 |
| JP | 2018-137567 A | 8/2018 |

OTHER PUBLICATIONS

Notification of Transmittal of the International Search Report and the Written Opinion of the International Searching Authority, or the Declaration (PCT/ISA/220), International Application No. PCT/JP2019/045883, dated Dec. 24, 2019.

Written Opinion of the International Search Authority (PCT/ISA/237), International Application No. PCT/JP2019/045883, dated Dec. 24, 2019.

Extended European Search Report dated Dec. 1, 2021 for corresponding European Application No. 19892677.3.

\* cited by examiner

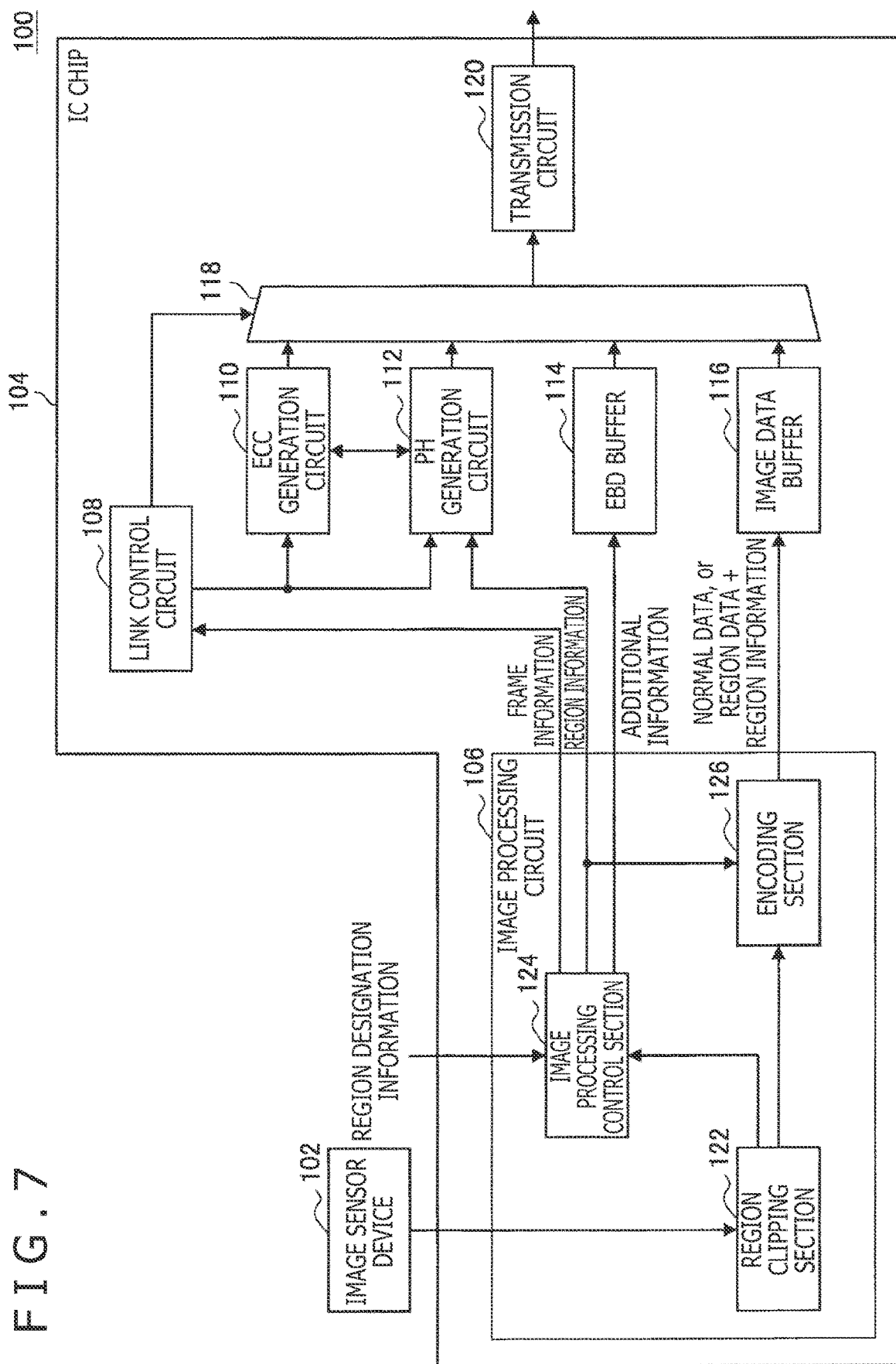
F I G . 7

F I G. 21    TYPE OF HEADER INFORMATION (Header Info Type)

| Byte | Bit | Contents |
|------|-----|----------|
| H5 | 47 | EBD Line |
| H5 | 46 | Data ID[3] |
| H5 | 45 | Data ID[2] |
| H5 | 44 | Data ID[1] |
| H5 | 43 | Data ID[0] |
| H5 | 42 | Outputs "0" |
| H5 | 41 | Outputs "0" |
| H5 | 40 | Outputs "0" |
| H4 | 39 | Reserved |
| H4 | 38 | Reserved |
| H4 | 37 | Reserved |
| H4 | 36 | Reserved |
| H4 | 35 | Reserved |
| H4 | 34 | Reserved |
| H4 | 33 | Reserved |
| H4 | 32 | Reserved |
| H3 | 31 | Reserved |
| H3 | 30 | Reserved |
| H3 | 29 | Reserved |
| H3 | 28 | Reserved |
| H3 | 27 | Reserved |
| H3 | 26 | Reserved |
| H3 | 25 | Reserved |
| H3 | 24 | Reserved |
| H2 | 23 | Reserved |
| H2 | 22 | Reserved |
| H2 | 21 | Reserved |
| H2 | 20 | Reserved |
| H2 | 19 | Reserved |
| H2 | 18 | Reserved |
| H2 | 17 | Reserved |
| H2 | 16 | Reserved |

EXTENSION

FIG. 22

TYPE OF HEADER INFORMATION
(Header Info Type)

| Byte | Bit | Contents |
|---|---|---|
| H5 | 47 | EBD_Line |
| | 46 | Data ID[3] |
| | 45 | Data ID[2] |
| | 44 | Data ID[1] |
| | 43 | Data ID[0] |
| | 42 | Outputs "0" |
| | 41 | Outputs "0" |
| | 40 | Outputs "1" |
| H4 | 39 | Reserved |
| | 38 | Reserved |
| | 37 | Reserved |
| | 36 | Reserved |
| | 35 | Reserved |
| | 34 | Reserved |
| | 33 | Reserved |
| | 32 | Reserved |

PAYLOAD LENGTH

| Byte | Bit | Contents |
|---|---|---|
| H3 | 31 | Line Length[15] |
| | 30 | Line Length[14] |
| | 29 | Line Length[13] |
| | 28 | Line Length[12] |
| | 27 | Line Length[11] |
| | 26 | Line Length[10] |
| | 25 | Line Length[9] |
| | 24 | Line Length[8] |
| H2 | 23 | Line Length[7] |
| | 22 | Line Length[6] |
| | 21 | Line Length[5] |
| | 20 | Line Length[4] |
| | 19 | Line Length[3] |
| | 18 | Line Length[2] |
| | 17 | Reserved |
| | 16 | Reserved |

F I G. 24

| Byte | Bit | Contents |
|---|---|---|
| H3 | 31 | Line Length[15] |
| | 30 | Line Length[14] |
| | 29 | Line Length[13] |
| | 28 | Line Length[12] |
| | 27 | Line Length[11] |
| | 26 | Line Length[10] |
| | 25 | Line Length[9] |
| | 24 | Line Length[8] |
| H2 | 23 | Line Length[7] |
| | 22 | Line Length[6] |
| | 21 | Line Length[5] |
| | 20 | Line Length[4] |
| | 19 | Line Length[3] |
| | 18 | Line Length[2] |
| | 17 | Reserved |
| | 16 | Reserved |

TYPE OF HEADER INFORMATION INDICATIVE OF
TRANSMISSION OF REGION INFORMATION (Header Info Type)

| Byte | Bit | Contents |
|---|---|---|
| H5 | 47 | EBD Line |
| | 46 | Data ID[3] |
| | 45 | Data ID[2] |
| | 44 | Data ID[1] |
| | 43 | Data ID[0] |
| | 42 | Outputs "0" |
| | 41 | Outputs "0" |
| | 40 | Outputs "1" |
| H4 | 39 | Reserved |
| | 38 | Reserved |
| | 37 | Reserved |
| | 36 | Reserved |
| | 35 | Reserved |
| | 34 | Reserved |
| | 33 | Reserved |
| | 32 | Reserved |

INFORMATION INDICATIVE OF TRANSMISSION OF REGION COORDINATES
INFORMATION INDICATIVE OF TRANSMISSION OF REGION DATA

RECEPTION APPARATUS AND TRANSMISSION APPARATUS

CROSS REFERENCE TO RELATED APPLICATIONS

The present application is a Continuation of application Ser. No. 17/290,545, filed Apr. 30, 2021, which is a 371 National Stage Entry of International Application No.: PCT/JP2019/045883, filed on Nov. 22, 2019, which claims the benefit of Japanese Priority Patent Application JP 2018-229200 filed on Dec. 6, 2018, the entire contents of which are incorporated herein by reference.

TECHNICAL FIELD

The present disclosure relates to a reception apparatus and a transmission apparatus.

BACKGROUND ART

One method of image exposure with an image sensor involves adjusting the exposure time of the image sensor in a manner acquiring images with appropriate brightness.

The existing common method of compensating lack of sensitivity with an exposure time can lead to a motion blur corresponding to the length of the exposure time in the case where a moving subject is captured. Methods have thus been proposed by which, at the time of image signal acquisition from the image sensor, the exposure time is shortened as much as possible to minimize the occurrence of motion blur. The methods involve using at least two frames overlaid on each other for motion compensation to avoid the motion blur, thereby solving the problem of lack of sensitivity or a reduced S/N ratio with regard to appropriate exposure.

Recent years have seen more image sensors being developed for higher resolution. Given the proposed techniques above, a high-resolution image sensor needs an internal buffer memory if the time required to transfer multiple acquired images exceeds a transferrable time under hardware constraints. Solutions to such a problem have been proposed with such techniques as those of PTL 1 to PTL 4 cited below.

CITATION LIST

Patent Literature

[PTL 1]
Japanese Patent Laid-open No. 2008-160881
[PTL 2]
Japanese Patent Laid-open No. Hei 11-331643
[PTL 3]
Japanese Patent Laid-open No. 2001-250119
[PTL 4]
Japanese Patent Laid-open No. 2002-230544

SUMMARY

Technical Problem

Still, the technique disclosed in PTL 1 is subject to constraints on the generation of images in the high dynamic range. The techniques disclosed in PTL 2 to PTL 4 involve estimating and removing the motion blur from captured images, requiring complex algorithms and circuit configurations.

Thus, the present disclosure proposes a novel and improved reception apparatus and transmission apparatus capable of suppressing the generation of motion blur, generation of saturated regions, and generation of reduced S/N ratio at the same time.

Solution to Problem

According to the present disclosure, there is provided a reception apparatus including a reception section configured to receive image data at least either in a first mode for receiving the image data of a whole captured region or in a second mode for receiving the image data of only a partial region in the captured region, and an information processing section configured to generate an image based on the image data received by the reception section. At the time of image data receipt in the second mode, the information processing section receives the image data to which a parameter different from that in the first mode is added.

Also according to the present disclosure, there is provided a transmission apparatus including an image processing section configured to read out image data at least either in a first mode for reading out a whole captured region or in a second mode for reading out a partial region in the captured region, and a transmission section configured to store the image data read out by the image processing section into a transmitting signal complying with a predetermined format before transmitting the image data. The image processing section varies a rate at which the image is to be read out in the second mode.

BRIEF DESCRIPTION OF DRAWINGS

FIG. 7 is a hardware block diagram depicting a configuration example of the image sensor 100 of the present embodiment.

FIG. 21 is an explanatory diagram explaining an extension provided in a packet header.

FIG. 22 is another explanatory diagram explaining the extension provided in the packet header.

FIG. 24 is an explanatory diagram explaining a structural example of the packet header.

DESCRIPTION OF EMBODIMENT

Figure 1:
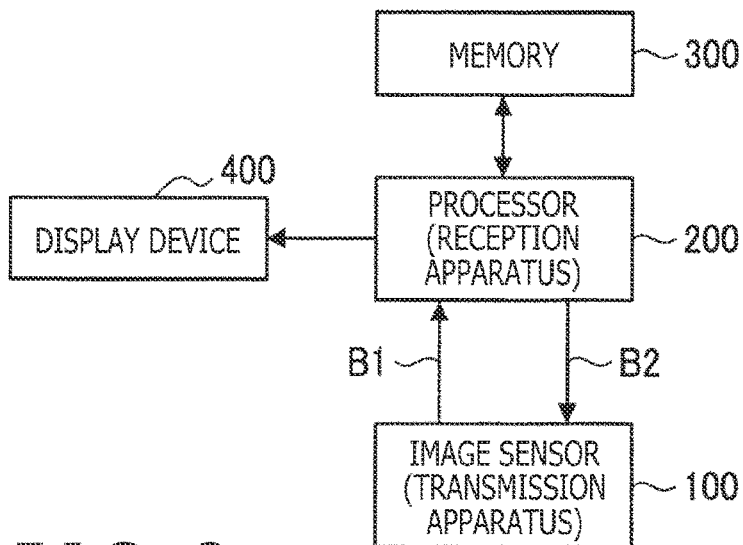
FIG. 1 is an explanatory diagram depicting a configuration example of a communication system 1000 embodying the present disclosure.

A preferred embodiment of the present disclosure is described below with reference to the accompanying drawings. Note that, throughout the ensuing description and the drawings, the constituent elements having substantially identical functions and configurations are represented by the same reference signs, and redundant explanation is not repeated.

The description is made in the following order:
1. Embodiment of the present disclosure
　1.1. Background
　1.2. Configuration examples
　1.3. Operation examples
2. Conclusion

1. EMBODIMENT OF THE PRESENT DISCLOSURE

1.1. Background

Prior to a detailed explanation of the embodiment of the present disclosure, the background of how the present disclosure came about is explained first.

One existing common method of image acquisition and exposure with an image sensor involves adjusting the exposure time of the image sensor in a manner acquiring images with appropriate brightness. For example, in the case where a moving image of 30 fps is acquired and where the subject is so bright as to cause overexposure, attempts are made to maintain appropriate brightness with an exposure time shorter than $\frac{1}{30}$ seconds ($\approx 33.3$ milliseconds). On the other hand, in the case where the subject is so dark as to cause underexposure, attempts are made to acquire the image by using a maximum exposure time of $\frac{1}{30}$ seconds that can be allocated to one frame at 30 fps.

However, the existing common method of compensating the lack of sensitivity with exposure time has the problem of incurring a motion blur corresponding to the length of exposure time when a moving subject is captured. One solution to this problem is the known method of shortening the exposure time as much as possible to minimize the occurrence of motion blur at the time of image acquisition from the image sensor, with at least two acquired frames of the image signal being used for motion compensation. The images are thus overlaid on one another in a manner averting the motion blur, which makes it possible to prevent lack of sensitivity or a reduced S/N ratio with regard to appropriate exposure.

In recent years, more image sensors for higher resolution have been developed for the purpose of surveying extensive areas with enhanced resolution, for example. Given the above-cited existing techniques, the high-resolution image sensor needs an internal buffer memory if the time required to transfer multiple acquired images from the image sensor exceeds a transferrable time subject to hardware constraints.

On the other hand, even with appropriate exposure at $\frac{1}{30}$ seconds for a whole image, a partial bright portion in the image may be saturated when acquired. PTL 1 proposes the technique for dealing with such a case. The proposed technique involves acquiring as many as n images separately at n times upon acquiring a single-frame image, the n images being subjected to signal processing such as to obtain an image in the high dynamic range. However, the technique disclosed in PTL 1 is capable of generating high-dynamic range images only at a maximum frame rate of 1/n with regard to a moving image of the maximum frame rate calculated from the hardware constraints on the transfer rate.

The solutions to the phenomenon of motion blur occurring in proportion to the length of exposure time have been proposed in PTL 2 to PTL 4, for example, including a method of removing the motion blur from captured images (motionless and moving images) and an image processing apparatus designed for motion blur removal. PTL 2 describes an image processing method for removing motion blur from captured images, the method being applied to an apparatus that enables images captured at 900 fps or higher to be displayed on a display apparatus of 30 fps. Further, PTL 3 and PTL 4 describe real-time image processing methods for removing motion blur from a captured image before outputting the image. However, the techniques described in the pieces of cited literature all involve estimating and removing the motion blur from captured images. In this respect, it is difficult for these techniques to completely remove the motion blur besides requiring complex algorithms and circuit configurations.

In view of the above circumstances, the discloser of the present disclosure carefully studied techniques of reducing the generation of motion blur, generation of saturated regions, and generation of reduced S/N ratio simultaneously. As a result, as will be explained below, the discloser of the present disclosure conceived of the technique of reading regions set in the image, thereby simultaneously reducing the generation of motion blur, generation of saturated regions, and generation of reduced S/N ratio.

The preceding paragraphs have discussed the background of how the present disclosure came about. What follows is a detailed explanation of how the present disclosure may be implemented.

1.2. Configuration Examples (1) Configuration of the Communication System to which a Transmission Method of the Present Embodiment May be Applied Explained first is a configuration example of the communication system to which a transmission method of the present embodiment may be applied.

Explained below is an example in which the apparatuses constituting the communication system of the present embodiment communicate with each other by a method complying with the MIPI (Mobile Industry Processor Interface) CSI-2 (Camera Serial Interface 2) standard. It is to be noted that the MIPI CSI-2 standard is not limitative of the methods of communication between the apparatuses constituting the communication system of the present embodiment. Alternatively, a communication method complying with another standard worked out by the MIPI alliance, such as the MIPI CSI-3 standard or the MIPI DSI (Display Serial Interface) standard may be adopted for communication between the apparatuses constituting the communication system of the present embodiment, for example. In addition, obviously, the standards worked out by the MIPI alliance are not limitative of the methods of communication between the apparatuses constituting the communication system of the present embodiment.

FIG. 1 is an explanatory diagram depicting a configuration example of a communication system 1000 embodying the present disclosure. Examples of the communication system 1000 include a communication apparatus such as a smartphone, a drone (a device that can be operated remotely or can act autonomously), and a mobile object such as a car. Note that these examples are not limitative of the examples of the communication system 1000 to which the present disclosure may be applied. Other examples of the communication system 1000 will be discussed later.

The communication system 1000 has an image sensor 100, a processor 200, a memory 300, and a display device 400, for example.

The image sensor 100 has an imaging function and a transmission function and thereby transmits data indicative of an image generated by imaging. The processor 200 receives the data transmitted from the image sensor 100 and processes the received data. That is, in the communication system 1000, the image sensor 100 acts as a transmission apparatus and the processor 200 as a reception apparatus.

Note that, although FIG. 1 depicts the communication system 1000 having a single image sensor 100, this is not limitative of the number of image sensors 100 possessed by the communication system of the present embodiment. Alternatively, the communication system embodying the present disclosure may have two or more image sensors 100, for example.

Further, although FIG. 1 depicts the communication system 1000 having a single processor 200, this is not limitative of the number of processors 200 possessed by the communication system of the present embodiment. Alternatively, the communication system embodying the present disclosure may have two or more processors 200, for example.

In a communication system that has multiple image sensors 100 and multiple processors 200, there may be a one-to-one correspondence therebetween. Alternatively, one processor 200 may correspond to multiple image sensors 100. Also in the communication system that has multiple image sensors 100 and multiple processors 200, one image sensor 100 may correspond to multiple processors 200.

Also in the communication system that has multiple image sensors 100 and multiple processors 200, communication takes place between the image sensors 100 and the processors 200 in a manner similar to that of the communication system 1000 depicted in FIG. 1.

The image sensor 100 and the processor 200 are electrically connected with each other by a data bus B1. The data bus B1 is a signal transmission path that connects the image sensor 100 with the processor 200. For example, the data indicative of an image sent from the image sensor 100 (the data may be referred to as "image data" hereunder) is transmitted from the image sensor 100 to the processor 200 over the data bus B1.

In the communication system 1000, signals are transmitted over the data bus B1 by a communication method complying with a predetermined standard such as the MIPI CSI-2 standard, for example.

Figure 2:
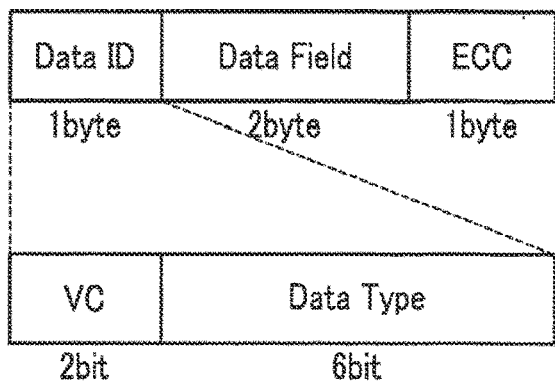
FIG. 2 is an explanatory diagram depicting a packet format according to the MIPI CSI-2 standard.
Figure 3:
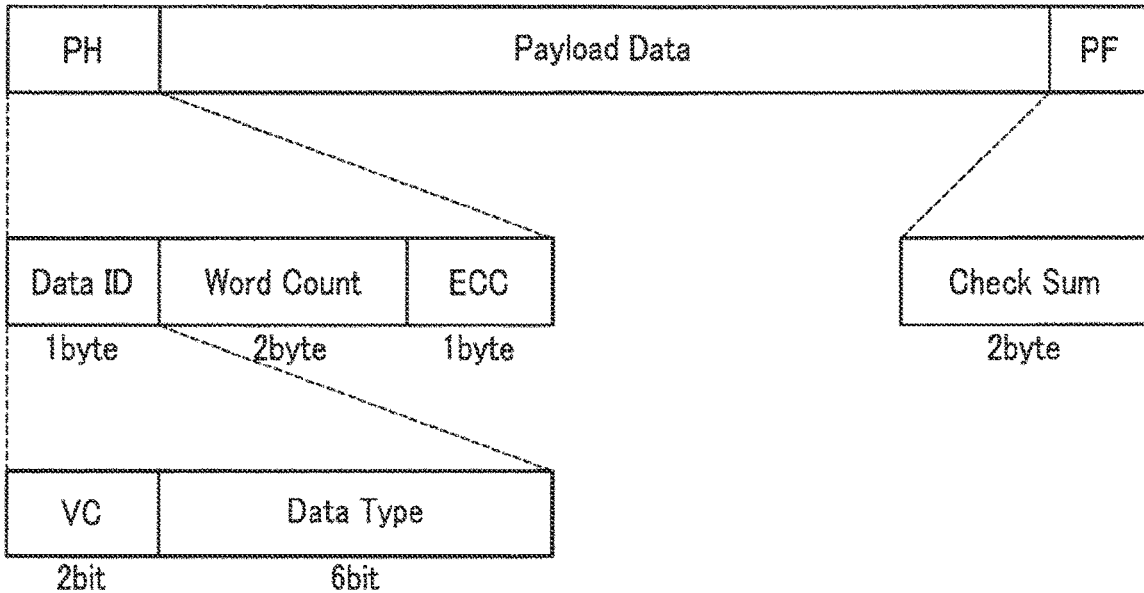
FIG. 3 is an explanatory diagram depicting another packet format according to the MIPI CSI-2 standard.

FIGS. 2 and 3 are explanatory diagrams depicting packet formats according to the MIPI CSI-2 standard. FIG. 2 depicts a short packet format prescribed by the MIPI CSI-2 standard, and FIG. 3 depicts a long packet format prescribed by the MIPI CSI-2 standard.

The long packet constitutes data including a packet header ("PH" depicted in FIG. 3), a payload ("Payload Data" depicted in FIG. 3), and a packet footer ("PF" depicted in FIG. 3). The short packet, as depicted in FIG. 2, constitutes data that has a structure similar to that of the packet header ("PH" depicted in FIG. 3).

The short packet and the long packet each record a VC (Virtual Channel) number ("VC" depicted in FIGS. 2 and 3; VC value) in the header part. Each packet may be assigned an appropriate VC number. The packets that are assigned the same VC number are handled as the packets belonging to the same image data.

Also, the short packet and the long packet each record a DT (Data Type) value ("Data Type" depicted in FIGS. 2 and 3) in the header part. Thus, as with the VC number, the packets that are assigned the same DT value may be handled as the packets belonging to the same image data.

"Word Count" in the header part of the long packet records the end of the packet by using a word count. "ECC" in the header part of the short packet and of the long packet records an Error Correcting Code.

According to the MIPI CSI-2 standard, a high-speed differential signal is used in a data signal transmission period, and a low-power signal is used in a data signal blanking period. Further, the period in which the high-speed differential signal is used is referred to as the HPS (High Speed State) period, and the period in which the low-power signal is used is referred to as the LPS (Low Power State) Period.

Figure 4:
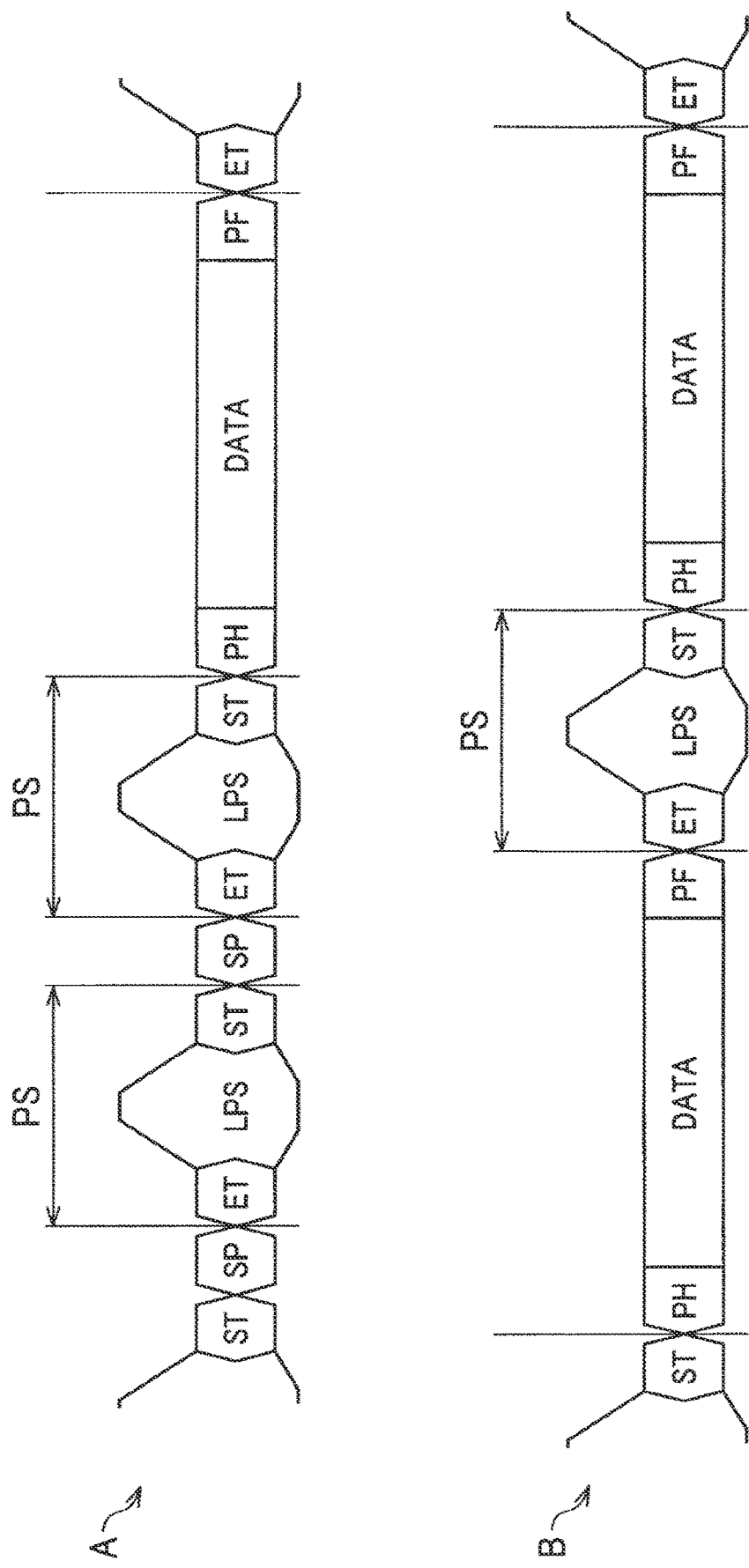
FIG. 4 depicts explanatory diagrams illustrating signal waveform examples related to the transmission of packets according to the MIPI CSI-2 standard.

FIG. 4 depicts explanatory diagrams depicting signal waveform examples related to the transmission of packets according to the MIPI CSI-2 standard. In FIG. 4, subfigure A depicts an example of packet transmission, and subfigure B depicts another example of packet transmission. The acronyms "ST," "ET," "PH," "PF," "SP," and "PS" in FIG. 4 stand for the following:

ST: Start of Transmission
ET: End of Transmission
PH: Packet Header
PF: Packet Footer
SP: Short Packet
PS: Packet Spacing As depicted in FIG. 4, the differential signal in the LPS period ("LPS" depicted in FIG. 4) and the differential signal in the HPS period (other than "LPS depicted in FIG. 4) are recognized to be different in amplitude. Thus, from the point of view of improving transmission efficiency, it is preferred that the LPS periods be excluded as much as possible.

The image sensor 100 and the processor 200 are electrically connected with each other by a control bus B2, for example, which is different from the data bus B1. The control bus B2 is another signal transmission path that connects the image sensor 100 with the processor 200. For example, control information output from the processor 200 is transmitted from the processor 200 to the image sensor 100 over the control bus B2.

The control information includes, for example, information for control purposes and processing instructions.

Examples of the information for control purposes include the data for controlling the function of the image sensor 100, such as at least data indicative of an image size, data indicative of a frame rate, or data indicative of an output delay amount ranging from the receipt of an image output instruction to the output of an image. Further, the control information may also include identification information identifying the image sensor 100. The identification information may, for example, be any appropriate data that can identify the image sensor 100, such as ID set to the image sensor 100.

Note that the information to be transmitted from the processor 200 to the image sensor 100 over the control bus B2 is not limited to the above-mentioned examples. Alternatively, the processor 200 may transmit region designation information designating regions in the image over the control bus B2, for example. The region designation information may include data of an appropriate format for identifying regions, such as data indicative of the positions of the pixels included in the region (e.g., coordinate data representing the coordinates indicative of the positions of the pixels in the region).

Although FIG. 1 depicts an example in which the image sensor 100 and the processor 200 are electrically connected with each other by the control bus B2, the image sensor 100 and the processor 200 need not be connected via the control bus B2. Alternatively, the image sensor 100 and the processor 200 may exchange the control information therebetween by wireless communication based on an appropriate communication method, for example.

Explained below are the components constituting the communication system 1000 depicted in FIG. 1.

(1-1) Memory 300

The memory 300 is a recording medium possessed by the communication system 1000. Examples of the memory 300 include a volatile memory such as a RAM (Random Access Memory) and a nonvolatile memory such as a flash memory. The memory 300 operates on the power supplied from an internal power supply such as a battery (not depicted) constituting part of the communication system 1000, or on the power supplied from a power source external to the communication system 1000.

The memory 300 stores, for example, images output from the image sensor 100. The recording of images to the memory 300 is controlled by the processor 200, for example.

(1-2) Display Device 400

The display device 400 is a display device possessed by the communication system 1000. Examples of the display device 400 include a liquid crystal display and an organic EL display (Organic Electro-Luminescence Display; also referred to as an OLED display (Organic Light Emitting Diode Display). The display device 400 operates on the power supplied from an internal power supply such as a battery (not depicted) constituting part of the communication system 1000, or on the power supplied from a power source external to the communication system 1000.

The display screen of the display device 400 displays diverse images and screens, such as images output from the image sensor 100, screens related to applications executed by the processor 200, and screens related to UI (User Interface), for example. The display of images and others on the display screen of the display device 400 is controlled by the processor 200, for example.

(1-3) Processor 200 (Reception Apparatus)

The processor 200 receives data transmitted from the image sensor 100 and processes the received data. As discussed above, the processor 200 acts as a reception apparatus in the communication system 1000. A typical configuration related to the processing of the data transmitted from the image sensor 100 (i.e., a configuration for playing the role of a reception apparatus) will be discussed later.

The processor 200 includes at least one processor including an arithmetic circuit, such as an MPU (Micro Processing Unit), and various processing circuits, for example. The processor 200 operates on the power supplied from an internal power supply such as a battery (not depicted) constituting part of the communication system 1000, or on the power supplied from a power source external to the communication system 1000.

The processor 200 performs various processes including the process of controlling the recording of image data to a recording medium such as the memory 300, the process of controlling the display of images on the display screen of the display device 400, and the process of executing desired application software, for example. An example of the process of recording control involves "the process of transmitting the control data including recording instructions and the data to be recorded to a recoding medium to the recording medium such as the memory 300." Further, an example of the process of display control involves "the process of transmitting the control data including recording instructions and the data to be displayed on the display screen to a display device such as the display device 400."

Also, the processor 200 may control the function of the image sensor 100 by transmitting the control information thereto, for example. The processor 200 may further control the data transmitted from the image sensor 100 by sending the region designation information thereto, for example.

(1-4) Image Sensor 100 (Transmission Apparatus)

The image sensor 100 has an imaging function and a transmission function and thereby transmits data indicative of an image generated by imaging. As discussed above, the image sensor 100 acts as a transmission apparatus in the communication system 1000.

Examples of the image sensor 100 include image sensor devices operating by an appropriate method and capable of generating images, including "an imaging device such as a digital still camera, a digital video camera, or a stereo camera," "an infrared ray sensor," and "a range image sensor." The image sensor 100 has the function of transmitting the generated data. The image generated by the image sensor 100 represents the data indicative of the result of sensing by the image sensor 100. A configuration example of the image sensor 100 will be discussed later.

Using the transmission method of the present embodiment, to be discussed later, the image sensor 100 transmits the data corresponding to regions set in the image (referred to as "region data" hereunder). Transmission of the region data is controlled, for example, by a constituent element (to be discussed later) functioning as an image processing section of the image sensor 100. A region set in the image may be called an ROI (Region Of Interest) in some cases. In the description that follows, the regions set in the image may each be referred to as the "ROI."

Examples of the processing related to the setting of regions in the image include appropriate processes for identifying partial regions in the image (or appropriate processes for clipping partial regions from the image), such as "the process of detecting an object from the image and setting a region including the detected object" and "the process of setting the region designated by operation of a suitable operation device."

The processing related to the setting of regions in the image may be performed either by the image sensor 100 or by an external apparatus such as the processor 200. In the case where the image sensor 100 carries out the processing related to the setting of regions in the image, the image sensor 100 identifies the regions according to the result of the processing of setting regions in the image. Further, in the case where an external apparatus performs the processing related to the setting of regions in the image, for example, the image sensor 100 identifies the regions on the basis of the region designation information acquired from the external apparatus.

When the image sensor 100 transmits the region data, i.e., when it transmits the data representing portions of the image, the amount of the transmitted data is made smaller than the amount of the data representing the whole transmitted image. Thus, when the image sensor 100 transmits the region data, the reduced amount of data provides various advantages such as a shorter transmission time and a reduced load of transmission by the communication system 1000, for example.

It is to be noted that the image sensor 100 is also capable of transmitting the data indicative of the whole image.

In the case where the image sensor 100 has the function of transmitting the region data and the function of transmitting the data indicative of the whole image, the image sensor 100 may be configured to selectively switch between transmission of the region data and transmission of the whole image data.

The image sensor 100 transmits either the region data or the whole image data depending on an established operation mode, for example. The operation mode is established by operation of an appropriate operation device, for example.

Alternatively, the image sensor 100 may selectively switch between transmission of the region data and transmission of the whole image data on the basis of the region designation information acquired from an external apparatus. For example, when the region designation information is acquired from the external apparatus, the image sensor 100 transmits the region data regarding the region corresponding to the acquired region designation information; when the region designation information is not acquired from the external apparatus, the image sensor 100 transmits the data indicative of the whole image.

The communication system 1000 has the configuration depicted in FIG. 1, for example. It is to be noted that the example in FIG. 1 is not limitative of how the communication system of the present embodiment may be configured.

For example, although the image sensor 100 is depicted as an example of the apparatus serving as a transmission apparatus in FIG. 1, the apparatus acting as the transmission apparatus is not limited to the image sensor 100. Alternatively, in the case where the communication system of the present embodiment includes an image sensor device such as an imaging device and a transmitter connected electrically with the image sensor device, the transmitter may play the role of the transmission apparatus.

Further, although the processor 200 is depicted as an example of the apparatus acting as a reception apparatus in FIG. 1, the apparatus operating as the reception apparatus is not limited to the processor 200. Alternatively, in the communication system of the present embodiment, an appropriate device having the capability of receiving data may play the role of the reception apparatus, for example.

In the case where the image transmitted from the image sensor 100 is stored onto a recording medium external to the communication system, where the image transmitted from the image sensor 100 is stored into a memory in the processor 200, or where the image transmitted from the image sensor 100 is not recorded, the communication system of the present embodiment need not possess the memory 300.

Also, the communication system of the present embodiment may be configured without the display device 400 depicted in FIG. 1.

Further, the communication system of the present embodiment may be configured in a manner corresponding to the functions of electronic equipment, to be discussed later, in which the communication system of the present embodiment is employed.

Although the communication system has been explained in the preceding paragraphs as one embodiment of the present disclosure, the present embodiment is not limitative of the present disclosure. Alternatively, the present disclosure may be implemented in the form of various types of electronic equipment including a communication apparatus such as a smartphone, a drone (a device that can be operated remotely or can act autonomously), a mobile object such as a car, a computer such as a PC (Personal Computer), a tablet type apparatus, a game machine, and a surveillance camera.

Explained below is an outline of the operations of the communication system for reducing the generation of motion blur, generation of saturated regions, and generation of reduced S/N ratio at the same time.

Figure 5:
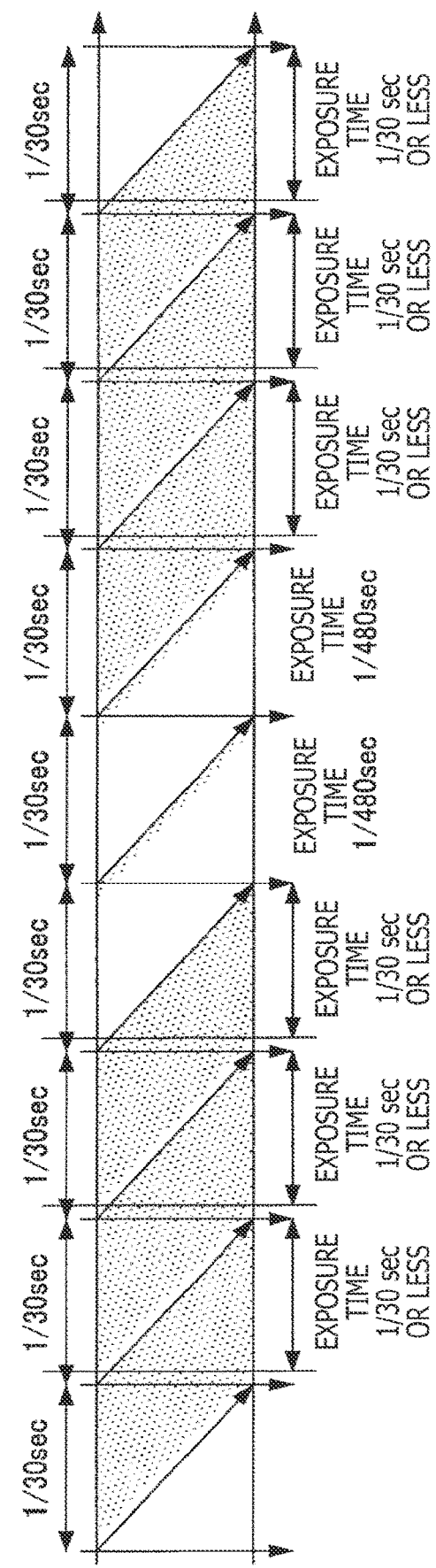
FIG. 5 is an explanatory diagram outlining the operations of an image sensor 100.

FIG. 5 is an explanatory diagram outlining the operations involved in changing a frame exposure time in the case where a whole image is transmitted from the image sensor 100 to the processor 200. FIG. 5 depicts a case in which the exposure time is shortened (to $\frac{1}{480}$ seconds or less in the example of FIG. 5) for some frames. When the whole image is transmitted from the image sensor 100 to the processor 200 in such a manner, the generation of a high-dynamic range image is subject to constraints as discussed above.

Figure 6:
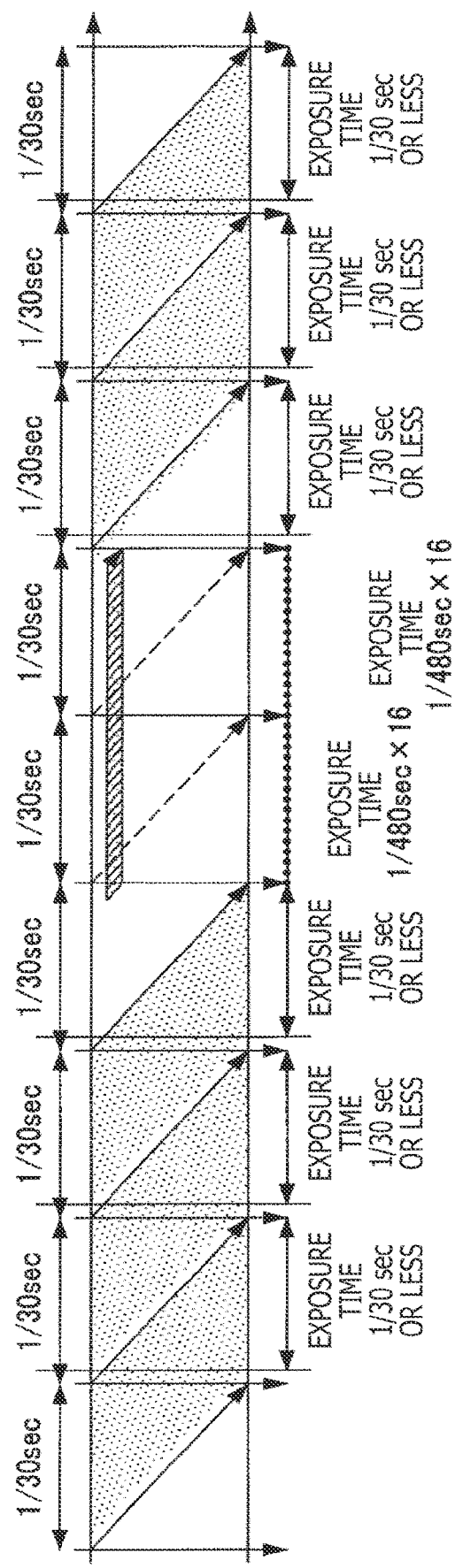
FIG. 6 is another explanatory diagram outlining the operations of the image sensor 100.

FIG. 6 is an explanatory diagram outlining the operations involved in changing the frame exposure time in the case where only some regions set in an image are transmitted from the image sensor 100 to the processor 200. FIG. 6 depicts a case in which the exposure time is shortened (to $\frac{1}{480}$ seconds in the example of FIG. 6) for some frames and in which multiple data items (16 items in the example of FIG. 6) whose vertical size measures $\frac{1}{16}$ of that of each of these frames are transmitted. That is, in the present embodiment, the image sensor 100 is configured to have at least two modes, i.e., one in which the whole captured region is read out and transmitted to the processor 200 and one in which set regions (ROI) are read out and transmitted to the processor 200.

When the data is transmitted as described above with the present embodiment, it is possible to let the processor 200 generate a high-resolution image of partial regions in the image by transmission of only the partial regions in the image while the amount of the transmitted data is kept the same as that of the whole transmitted image.

(Image Sensor 100)

Explained below is a configuration example of the image sensor 100 of the present embodiment. FIG. 7 is a hardware block diagram depicting a configuration example of the image sensor 100 of the present embodiment. The image sensor 100 includes an image sensor device 102 and an IC chip 104, for example. The image sensor 100 depicted in FIG. 7 operates on the power supplied from an internal power supply such as a battery (not depicted) constituting part of the communication system 1000, or on the power supplied from a power source external to the communication system 1000.

Examples of the image sensor device 102 include image sensor devices operating by an appropriate method and capable of generating images, including an "imaging device such as a digital still camera," an "infrared ray sensor," and a "range image sensor."

For example, the imaging device functioning as the image sensor device 102 includes a lens/imaging element and a signal processing circuit.

The lens/imaging element includes, for example, optical lenses and an image sensor that uses multiple imaging elements such as a CMOS (Complementary Metal Oxide Semiconductor) or a CCD (Charge Coupled Device).

The signal processing circuit includes, for example, an AGC (Automatic Gain Control) circuit and an ADC (Analog to Digital Converter) and thereby converts an analog signal generated by the imaging element into a digital signal (image data). Also, the signal processing circuit performs various processes related to RAW phenomena, for example. Further, the signal processing circuit may carry out diverse signal processing such as White Balance adjustment, color correction, gamma correction, YCbCr conversion, and edge enhancement.

Further, the signal processing circuit may perform processes related to the setting of regions in an image and transmit the region designation information to the IC chip 104. Moreover, the signal processing circuit may transfer diverse data including exposure information and gain information to the IC chip 104.

The signal indicative of the image generated by the image sensor device 102 is transferred to the IC chip 104. It is to be noted that, in the case where the signal representing the image transferred from the image sensor device 102 to the IC chip 104 is an analog signal, the IC chip 104 may let the internal ADC convert the analog signal to a digital signal, for example, and process the image data obtained by the conversion. The explanation below uses as an example the case in which image data is transferred from the image sensor device 102 to the IC chip 104.

The IC chip 104 is an IC (Integrated Circuit) that integrates circuits related to the function of data transmission in the form of a chip. The IC chip 104 processes the image data transferred from the image sensor device 102, and transmits data corresponding to the image thus generated. The data corresponding to the image is constituted by the image data transferred from the image sensor device 102 (i.e., data indicative of the whole image) or by the region information and region data. It is to be noted that the circuits related to the function of data transmission are not limited to the implementation of a single IC chip. Alternatively, these circuits may be implemented in the form of multiple IC chips.

The IC chip 104 includes, for example, an image processing circuit 106, a LINK control circuit 108, an ECC generation circuit 110, a PH generation circuit 112, an EBD buffer 114, an image data buffer 116, a composition circuit 118, and a transmission circuit 120.

The image processing circuit 106 is a circuit having the function of performing processes related to the transmission method of the present embodiment. In a case of carrying out the processes related to the transmission method of the present embodiment, the image processing circuit 106 sets the region information for each of the lines making up an image, and causes the LINK control circuit 108, the ECC generation circuit 110, the PH generation circuit 112, the EBD buffer 114, the image data buffer 116, the composition circuit 118, and the transmission circuit 120 to transmit the set region information and the region data corresponding to the regions involved, per line. Also, the image processing circuit 106 may transmit for each line the image data transferred from the image sensor device 102 (i.e., data indicative of the whole image).

An example of the image processing circuit 106 is a processor such as an MPU.

The functions possessed by the image processing circuit 106 are explained below by dividing them into functional blocks. As depicted in FIG. 7, the image processing circuit 106 includes a region clipping section 122, an image processing control section 124, and an encoding section 126, for example.

The region clipping section 122 performs the process of setting regions in an image. Given the image represented by the image data transferred from the image sensor device 102, the region clipping section 122 sets the regions of interest (ROI). For example, the region clipping section 122 performs the process of setting regions in the image depending on a currently set operation mode. In the case of an operation mode in which region data is to be transmitted, for example, the region clipping section 122 carries out the process of setting regions in the image. In the case of an operation mode in which the data indicative of the whole image is to be transmitted, the region clipping section 122 does not perform the process of setting regions in the image.

The region clipping section 122 detects objects from an image by performing an appropriate object detection process on the image, for example. For each of the detected objects, the region clipping section 122 sets regions that include the detected object. The region clipping section 122 may alternatively set regions designated by operation of an appropriate operation device.

In the case where regions are set, the region clipping section 122 transmits to the image processing control section 124 the region designation information designating the set regions, for example. In the case where regions are not set, the region clipping section 122 does not transmit any region designation information to the image processing control section 124.

Also, the region clipping section 122 transmits to the encoding section 126 the image data transferred from the image sensor device 102.

The image processing control section 124 performs processes related to the transmission method of the present embodiment. The image processing control section 124 sets the region information for each of the lines making up the image, and transmits the set region information to the encoding section 126 and to the PH generation circuit 112.

The image processing control section 124 identifies the region included in each of the lines making up the image, on the basis of the region designation information acquired from the region clipping section 122 or the region designation information (not depicted) obtained from an external apparatus, for example. Further, on the basis of the identified regions, the image processing control section 124 sets the region information for each line. At this point, as in the above-described process of exception, the image processing control section 124 need not set as the region information the information that remains unchanged from information included in the region information regarding the immediately preceding line to be transmitted.

In addition, in the case where the region designation information is not acquired, the image processing control section 124 does not set the region information.

It is to be noted that the above-described processing is not limitative of the processes performed by the image processing control section 124.

For example, the image processing control section 124 may, for example, generate frame information and transfer the generated frame information to the LINK control circuit 108. An example of the frame information is a VC number assigned to each frame. Further, the frame information may also include data indicative of a data type such as YUV data, RGB data, or RAW data.

In another example, the image processing control section 124 may perform the process of setting additional information and transfer the set additional information to the EBD buffer 114.

An example of the process of setting additional information is one in which the additional information is generated. Examples of the process of generating the additional information include at least the process of generating information indicative of the amount of region data, the process of generating information indicative of region sizes, or the process of generating information indicative of the priorities of regions.

It is to be noted that the process of setting additional information is not limited to the process of generating the additional information. Alternatively, the image processing control section 124 may set as the additional information the information acquired from the image sensor device 102 such as exposure information and gain information. As another alternative, the image processing control section 124 may set as the additional information various pieces of region-related data such as data indicative of a physical region length, data indicative of an output region length, data indicative of an image format, and data indicative of a total data amount. An example of the physical region length is the number of pixels of the image sensor device 102. An example of the output region length is the number of pixels in the image (length in the image) output from the image sensor device 102.

The encoding section 126 encodes, for example, the image data transferred from the image sensor device 102 by using, for example, an appropriate method complying with a predetermined standard such as the JPEG (Joint Photographic Experts Group) standard.

In the case where the region information is not acquired from the image processing control section 124, the encoding section 126 transfers the encoded image data to the image data buffer 116. In the description that follows, the encoded image data, i.e., the data indicative of the encoded whole image, may be referred to as "normal data."

In addition, in the case where the region information is acquired from the image processing control section 124, the encoding section 126 transfers to the image data buffer 116 the acquired region information and the encoded region data indicative of the regions.

For example, with the region clipping section 122, the image processing control section 124, and the encoding section 126 configured therein, the image processing circuit 106 performs processes related to the transmission method of the present embodiment. It is to be noted that the functions of the image processing circuit 106 are divided into the functional blocks as depicted in FIG. 7 for reasons of expediency and that this manner of dividing functions is not limitative of how the functions of the image processing circuit 106 may be divided.

The LINK control circuit 108 transfers, for example, the frame information for each line to the ECC generation circuit 110, to the PH generation circuit 112, and to the composition circuit 118.

The ECC generation circuit 110 sets an error-correcting code for each line. On the basis of the data of each line in the frame information (e.g., VC number or data type), for example, the ECC generation circuit 110 generates an error-correcting code for that line. For example, the ECC generation circuit 110 transfers the generated error-correcting code to the PH generation circuit 112 and to the composition circuit 118. The ECC generation circuit 110 may alternatively generate the error-correcting code in coordination with the PH generation circuit 112.

The PH generation circuit 112 generates a packet header for each line by use of the frame information.

The PH generation circuit 112 may alternatively generate the packet header on the basis of the region information transferred from the image processing circuit 106 (image processing control section 124 in the example of FIG. 7). Specifically, on the basis of the region information, the PH generation circuit 112 sets, in the packet header, such data as "data indicating whether or not the information included in the region information has changed from the region information included in the immediately preceding packet to be transmitted" (change information).

The EBD buffer 114 is a buffer that temporarily holds additional information transferred from the image processing circuit 106 (image processing control section 124 in the example of FIG. 7). The EBD buffer 114 outputs the additional information to the composition circuit 118 as "Embedded Data" in a suitably timed manner. Incidentally, the "Embedded Data" output from the EBD buffer 114 may be transferred to the composition circuit 118 by way of the image data buffer 116, to be discussed later. In the case where the additional information (ROI information) to be transmitted has been recognized by the processor 200 acting as a reception apparatus, registers may be set so as to skip the transmission of EBD data corresponding to the additional information from the transmission circuit 120, to be discussed later.

The image data buffer 116 is a buffer that temporarily holds data (normal data, or region information and region data) transferred from the image processing circuit 106 (encoding section 126 in the example of FIG. 7). The image data buffer 116 outputs the retained data in a suitably timed manner to the composition circuit 118, per line.

The composition circuit 118 generates a transmitting packet on the basis of the data acquired from the ECC generation circuit 110, from the PH generation circuit 112, from the EBD buffer 114, and from the image data buffer 116, for example.

Given the packets transferred from the composition circuit 118, the transmission circuit 120 transmits the packets per line over the data bus B1 (an example of the signal transmission path, which applies to the ensuing paragraphs) as transmitting data 147A. For example, the transmission circuit 120 transmits the packets by use of the high-speed differential signal such as the one depicted in FIG. 4.

Figure 8:
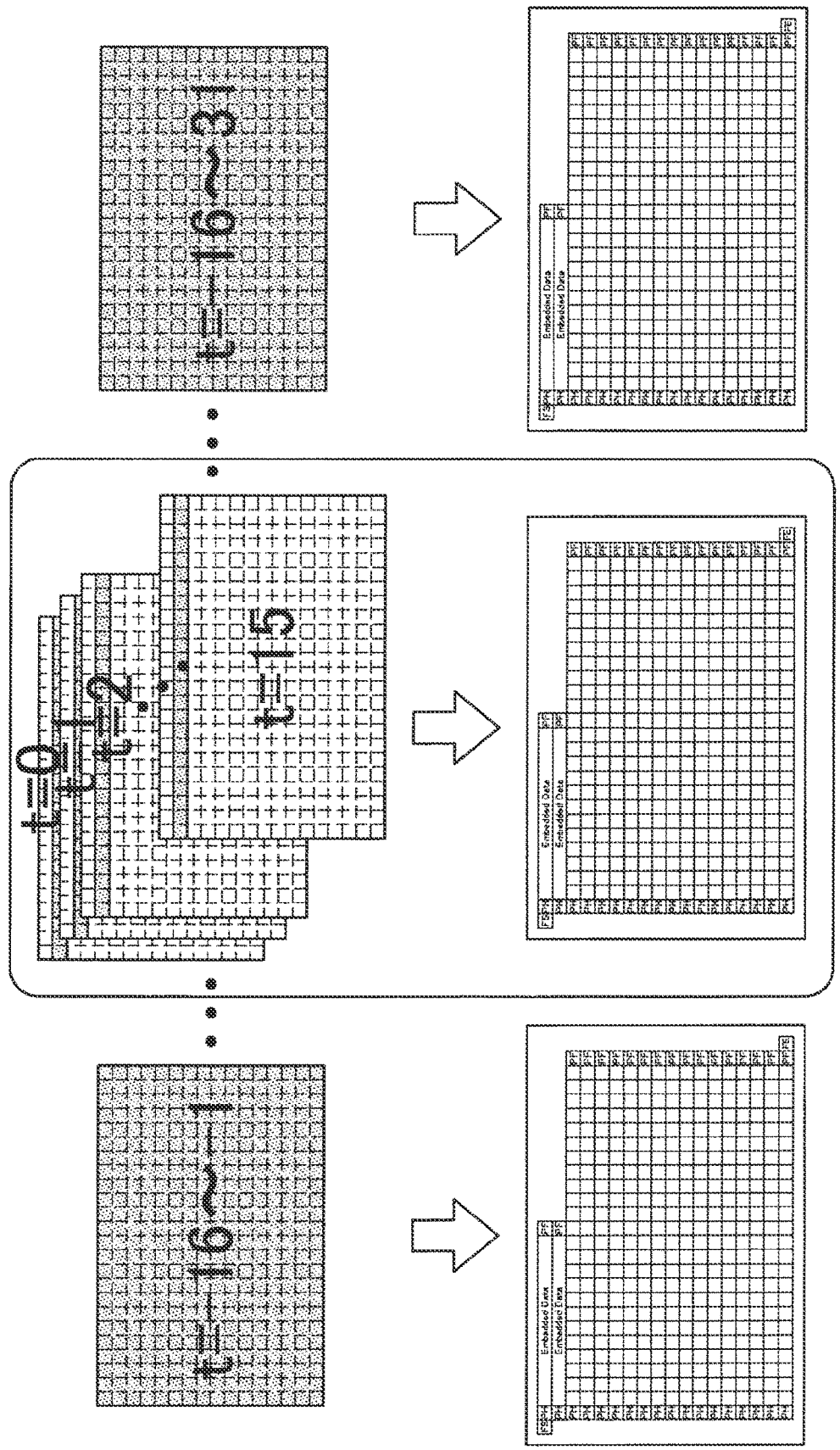
FIG. 8 is an explanatory diagram depicting a specific example of data transmitted by the image sensor 100 of the present embodiment.

Explained hereunder are specific examples of data transmitted by the image sensor 100 of the present embodiment. FIG. 8 is an explanatory diagram depicting one specific example of the data transmitted by the image sensor 100 of the present embodiment.

In FIG. 8, "FS" stands for an FS (Frame Start) packet according to the MIPI CSI-2 standard. Also in FIG. 8, "FE"

stands for an FE (Frame End) packet according to the MIPI CSI-2 standard (both acronyms are applicable to other drawings as well).

In FIG. 8, "Embedded Data" denotes data that can be embedded in the packets to be transmitted. For example, "Embedded Data" can be embedded in the header, payload, or footer of the packets to be transmitted. In the example of FIG. 8, region information is stored in the "Embedded Data" of one packet, and the "Embedded Data" with the region information stored therein represents additional data.

The present embodiment transmits two types of information: information in the form of "Embedded Data" indicative of a region size; and information indicating how many transmitting frames continue for the region of interest. When the information in the form of "Embedded Data" depicted in FIG. 8 indicating the region size and the information indicating how many transmitting frames continue for the region of interest are transmitted, the processor 200 can identify as many as n (16 in the example of FIG. 8) minimum rectangular regions including a minimum rectangular region indicated by t=0, a minimum rectangular region indicated by t=1, and so on up to a minimum rectangular region indicated by t=15 that are depicted in FIG. 8. That is, even if the processor 200 has neither the function of identifying the minimum rectangular regions including the above regions on the basis of the region information nor the function of identifying how many transmitting frames continue for the region of interest, the transmission of both the information in the form of "Embedded Data" depicted in FIG. 8 indicative of the region size and the information indicating how many transmitting frames continue for the region of interest enables the processor 200 to identify the minimum rectangular regions including the above regions on the basis of the region information and also to identify how many transmitting frames continue for the region of interest. It is to be noted that, obviously, the information indicative of the region size is not limited to the data indicating the minimum rectangular regions including the above regions.

Obviously, the above examples of the information transmitted in the form of "Embedded Data" depicted in FIG. 8 indicative of the amount of the region data, the information indicative of the region size, and the information indicating how many transmitting frames continue for the region of interest that are depicted in FIG. 8 are not limitative of such types of information. Furthermore, not all of such pieces of information need to be transmitted.

First, in the case where a whole image is transmitted from the image sensor 100, the image data per frame is set in Payload Data when transmitted. In the example of FIG. 8, one image is divided vertically into 16 portions, and the image data is stored in the Payload Data of each divided line. Obviously, the number of divisions in the vertical direction per frame is not limited to the number of this example.

Next, in the case where partial regions in the image are transmitted from the image sensor 100, such as where 16 images numbered 0 to 15 with ⅟16 size each in the vertical direction, are transmitted as depicted in FIG. 6, the data items numbered 0 to 15 are stored in the Payload Data. This enables the image sensor 100 to transmit multiple images with a short exposure time each in the same amount of data as when the whole image is transmitted.

Given the region size data and the information indicating that the whole screen continues to be transmitted for as long as it takes to transfer one frame in the "Embedded Data," the processor 200 acting as the reception apparatus can acquire the information indicative of the number of continuously transferred frames for the region of interest, based on the content of the "Embedded Data," even if there is no explicit information indicating how many frames are continuously transferred for that region.

Figure 9:
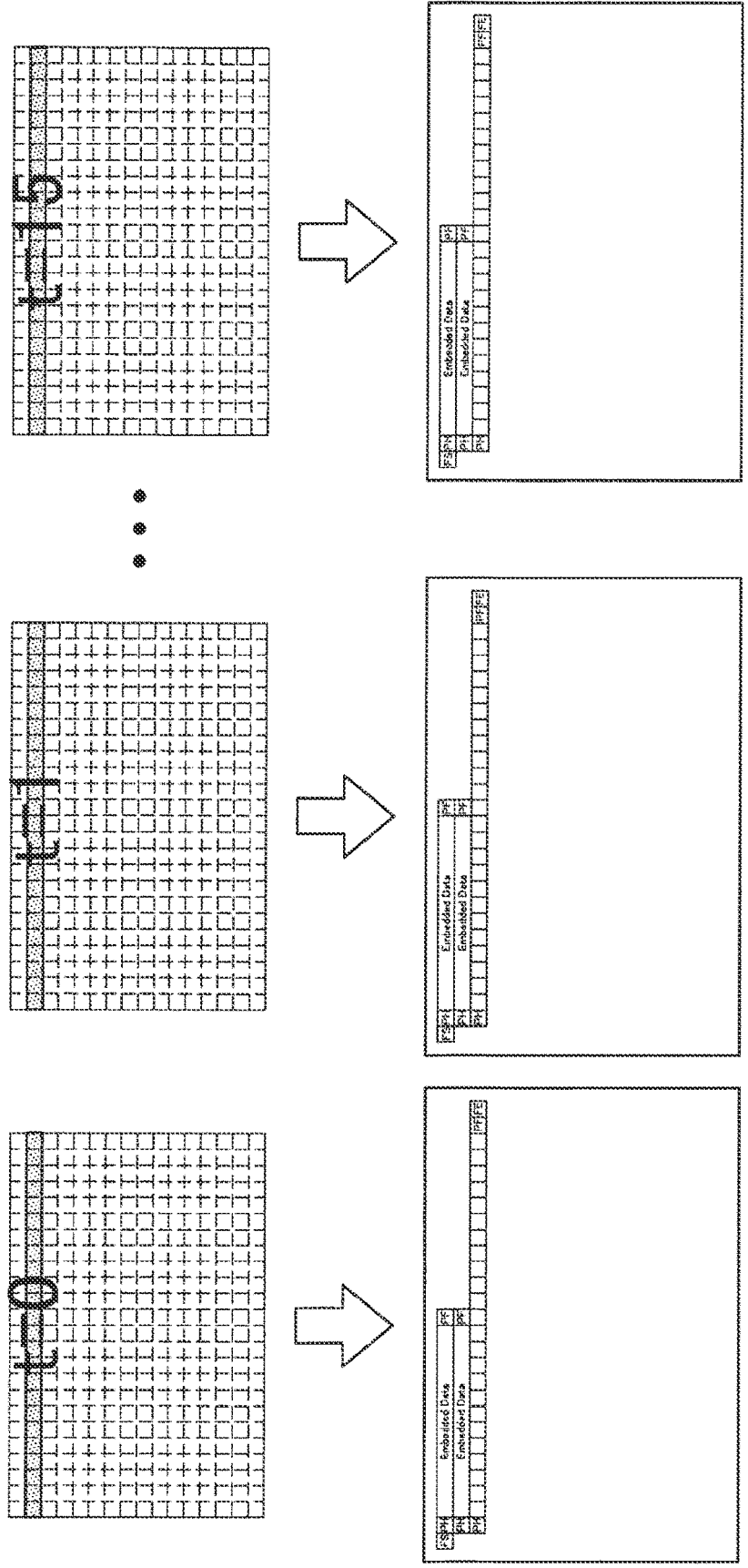
FIG. 9 is an explanatory diagram depicting another specific example of data transmitted by the image sensor 100 of the present embodiment.

The above example is not limitative of examples of the data transmitted from the image sensor 100. FIG. 9 is an explanatory diagram depicting another specific example of the data transmitted by the image sensor 100 of the present embodiment. The example depicted in FIG. 9 is a specific example in which 16 images numbered 0 to 15 with ⅟16 size each in the vertical direction are transmitted. What is different from the example in FIG. 8 is that the data of each image starts with an "FS" packet and ends with an "FE" packet when transmitted. In this example, each of the images numbered 0 to 15 is transmitted with the "Embedded Data," so that the amount of the data involved is slightly larger than that in the example depicted in FIG. 8. Still, the amount of the Payload Data remains the same as in the example of FIG. 8. It follows that the image sensor 100 can transmit multiple images with a short exposure time each in approximately the same data amount as when the whole image is transmitted.

(Processor 200)

Figure 10:
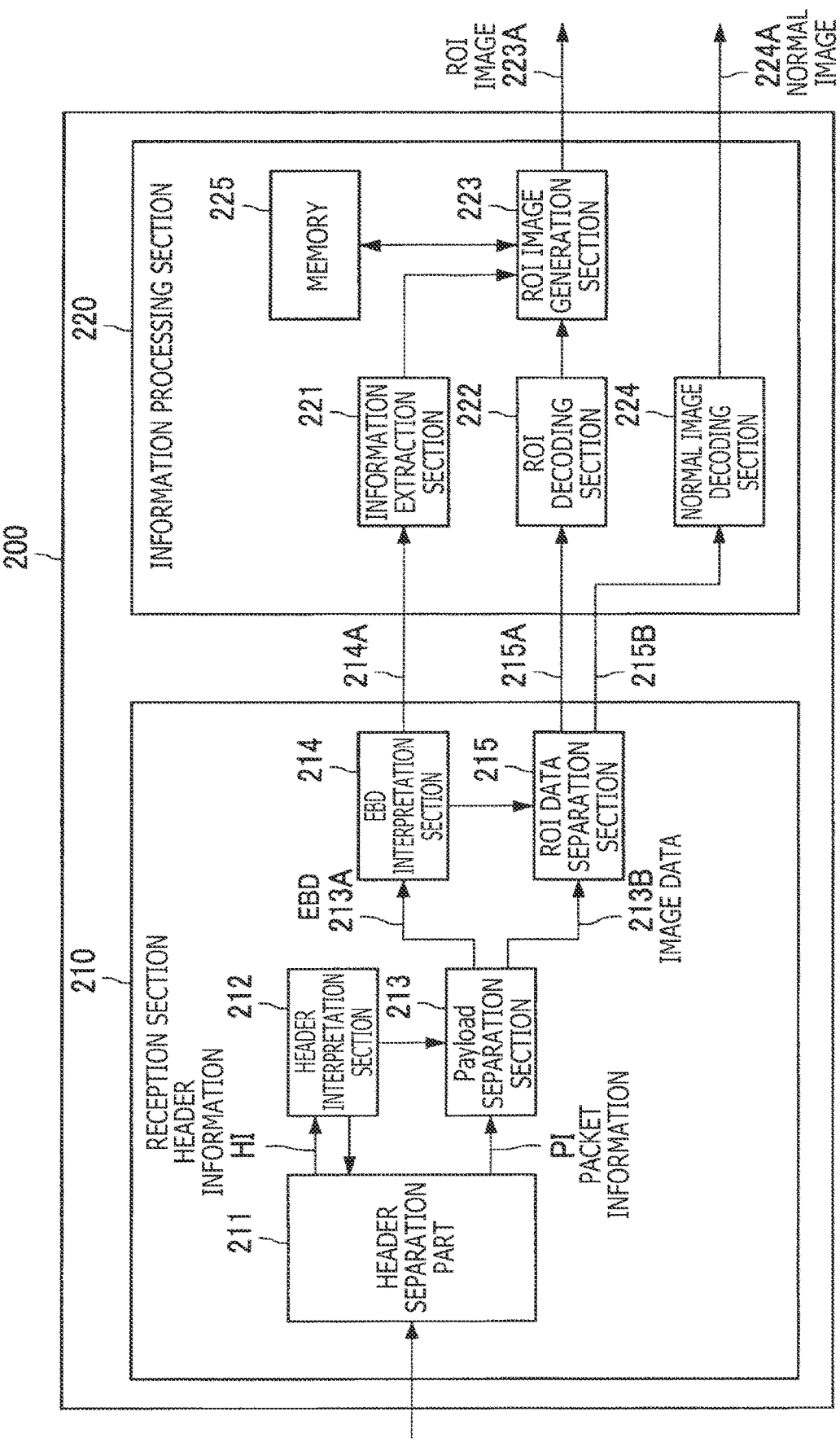
FIG. 10 is a view depicting a configuration example of a processor 200 of the present embodiment.

The processor 200 is explained next. FIG. 10 depicts a configuration example of the processor 200 of the present embodiment. The processor 200 is an apparatus that receives signals according to the same standard as that of the image sensor 100 (e.g., MIPI CSI-2 standard, MIPI CSI-3 standard, or MIPI DSI standard). The processor 200 includes a reception section 210 and an information processing section 220, for example. The reception section 210 is a circuit that receives the transmitting data 147A output from the image sensor 100 via a data lane DL and performs predetermined processes on the received transmitting data 147A, thereby generating diverse data (214A, 215A, and 215B) and transmitting the generated data to the information processing section 220. The information processing section 220 is a circuit that generates an ROI image 223A on the basis of the diverse data (214A and 215A) received from the reception section 210, or generates a normal image 224A on the basis of the data (215B) received from the reception section 210.

The reception section 210 includes a header separation section 211, a header interpretation section 212, a Payload separation section 213, an EBD interpretation section 214, and an ROI data separation section 215, for example.

The header separation section 211 receives the transmitting data 147A from the image sensor 100 via the data lane DL. That is, the header separation section 211 receives the transmitting data 147A that includes ROI information regarding the regions ROI set in the image captured by the image sensor 100, the transmitting data 147A further having the image data of each region ROI included in the Payload Data in a Long Packet. The header separation section 211 separates the received transmitting data 147A into a frame header region and a packet region. The header interpretation section 212 identifies the position of the Payload Data in the Long Packet included in the packet region, on the basis of data (specifically, the Embedded Data) included in the frame header region. The Payload separation section 213 separates the Payload Data in the Long Packet included in the packet region from the packet region on the basis of the Payload Data position in the Long Packet identified by the header interpretation section 212. In addition, in the case where the processor has recognized the additional information (ROI information) included in the EBD data or in the Long Packet, for example, it is possible to skip the transmission of part or all of the ROI information. Specifically, the processor causes the header interpretation section 212 to retain the information corresponding to the EBD data and, on the basis of the retained information, identifies the Payload Data position in the Long Packet included in the packet region.

The EBD interpretation section 214 outputs the Embedded Data as EBD data 214A to the information processing section 220. Further, from the data type included in the Embedded Data, the EBD interpretation section 214 determines whether the image data included in the Payload Data in the Long Packet is compressed image data derived from ROI image data or compressed image data derived from normal image data. The EBD interpretation section 214 outputs the result of the determination to the ROI data separation section 215.

In the case where the image data included in the Payload Data in the Long Packet is the compressed image data derived from ROI image data, the ROI data separation section 215 regards the Payload Data in the Long Packet as Payload Data 215A and outputs the Payload Data 215A to the information processing section 220 (specifically, the ROI decoding section 222). In the case where the image data included in the Payload Data is the compressed image data derived from normal image data, the ROI data separation section 215 regards the Payload Data in the Long Packet as Payload Data 215B and outputs the Payload Data 215B to the information processing section 220 (specifically, the normal image decoding section 224). In the case where the ROI information is included in the Payload Data in the Long Packet, the Payload Data 215A includes the ROI information and one-line pixel data out of the compressed image data.

The information processing section 220 extracts the ROI information from the Embedded Data included in the EBD data 214A. On the basis of the ROI information extracted by the information extraction section 221, the information processing section 220 extracts an image of each region of interest ROI in the captured image from the Payload Data in the Long Packet included in the transmitting data received by the reception section 210. For example, the information processing section 220 includes an information extraction section 221, an ROI decoding section 222, an ROI image generation section 223, a normal image decoding section 224, and a memory 225.

The normal image decoding section 224 generates the normal image 224A by decoding the Payload Data 215B. The ROI decoding section 222 generates image data 222A by decoding the compressed image data 147B included in the Payload Data 215A. The image data 222A includes one or multiple transmitting images.

The information extraction section 221 extracts the ROI information from the Embedded Data included in the EBD data 214A. The information extraction section 221 extracts, for example, the number of regions of interest ROI included in the captured image, the region number of each region of interest ROI, the data length of each region of interest ROI, and the image format of each region of interest ROI from the Embedded Data included in the EBD data 214A.

On the basis of the ROI information obtained by the information extraction section 221, the ROI image generation section 223 generates an image of each region of interest ROI in the captured image. The ROI image generation section 223 outputs the generated image as an ROI image 223A.

The memory 225 temporarily stores the ROI image generated by the ROI image generation section 223. Upon generating an ROI image, the ROI image generation section 223 performs the process of image composition with use of the ROI image stored in the memory 225. This allows the ROI image generation section 223 to generate the ROI image with a reduced motion blur.

Figure 11:
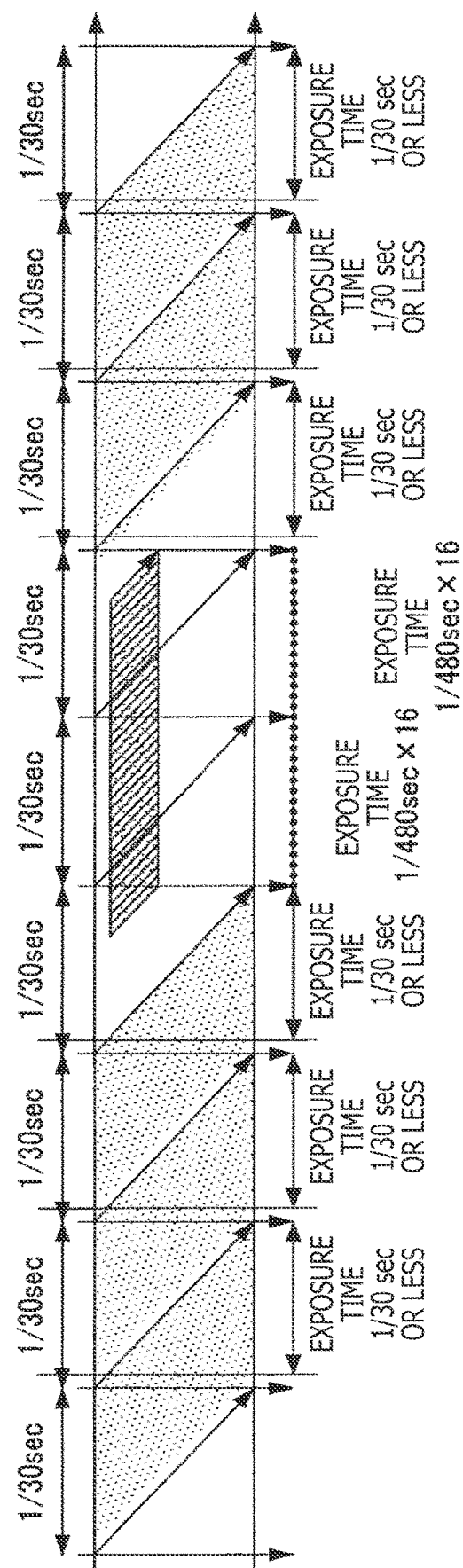
FIG. 11 is another explanatory diagram outlining the operations of the image sensor 100.

Whereas FIG. 6 depicts the example in which images of which the vertical size is $\frac{1}{16}$ of that of the whole image are transmitted, what is described below is another example. FIG. 11 is an explanatory diagram outlining the operations involved in changing the frame exposure time in the case where only the region set in an image is transmitted from the image sensor 100 to the processor 200. FIG. 11 depicts an example in which the exposure time is shortened (to $\frac{1}{480}$ seconds in the example of FIG. 11) for some frames and in which what is transmitted in these frames are multiple data items (16 in the example of FIG. 11) of which the vertical size and the horizontal size are $\frac{1}{4}$ each of the whole image.

Figure 12:
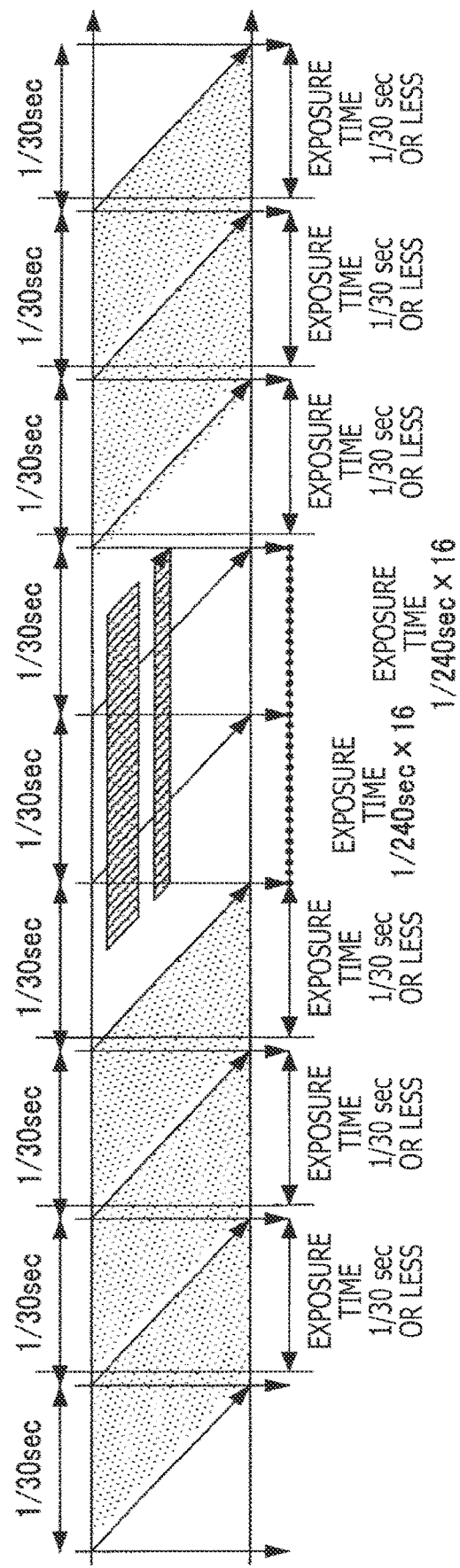
FIG. 12 is another explanatory diagram outlining the operations of the image sensor 100.

FIG. 12 is another explanatory diagram outlining the operations involved in changing the frame exposure time in the case where only the regions set in an image are transmitted from the image sensor 100 to the processor 200. FIG. 12 depicts an example in which the exposure time is shortened (to $\frac{1}{240}$ seconds in the example of FIG. 12) for some frames and in which what is transmitted in these frames are multiple data items (8 in the example of FIG. 12) of which the vertical size and the horizontal size are $\frac{1}{8}$ and $\frac{1}{4}$ of the whole image respectively, as well as multiple data items (8 in the example of FIG. 12) of which the vertical size and the horizontal size are $\frac{1}{16}$ and $\frac{1}{2}$ of the whole image respectively. That is, either the exposure time may be determined according to the size of the regions read out by the image sensor 100, or the size of the regions read out by the image sensor 100 may be determined according to the exposure time (or frame rate) of the image sensor 100. For example, the ROI image generation section 223 may either determine the frame rate of the image sensor 100 in keeping with the size of the ROI image to be generated, or determine the size of the ROI image in keeping with the frame rate of the image sensor 100.

Figure 13:
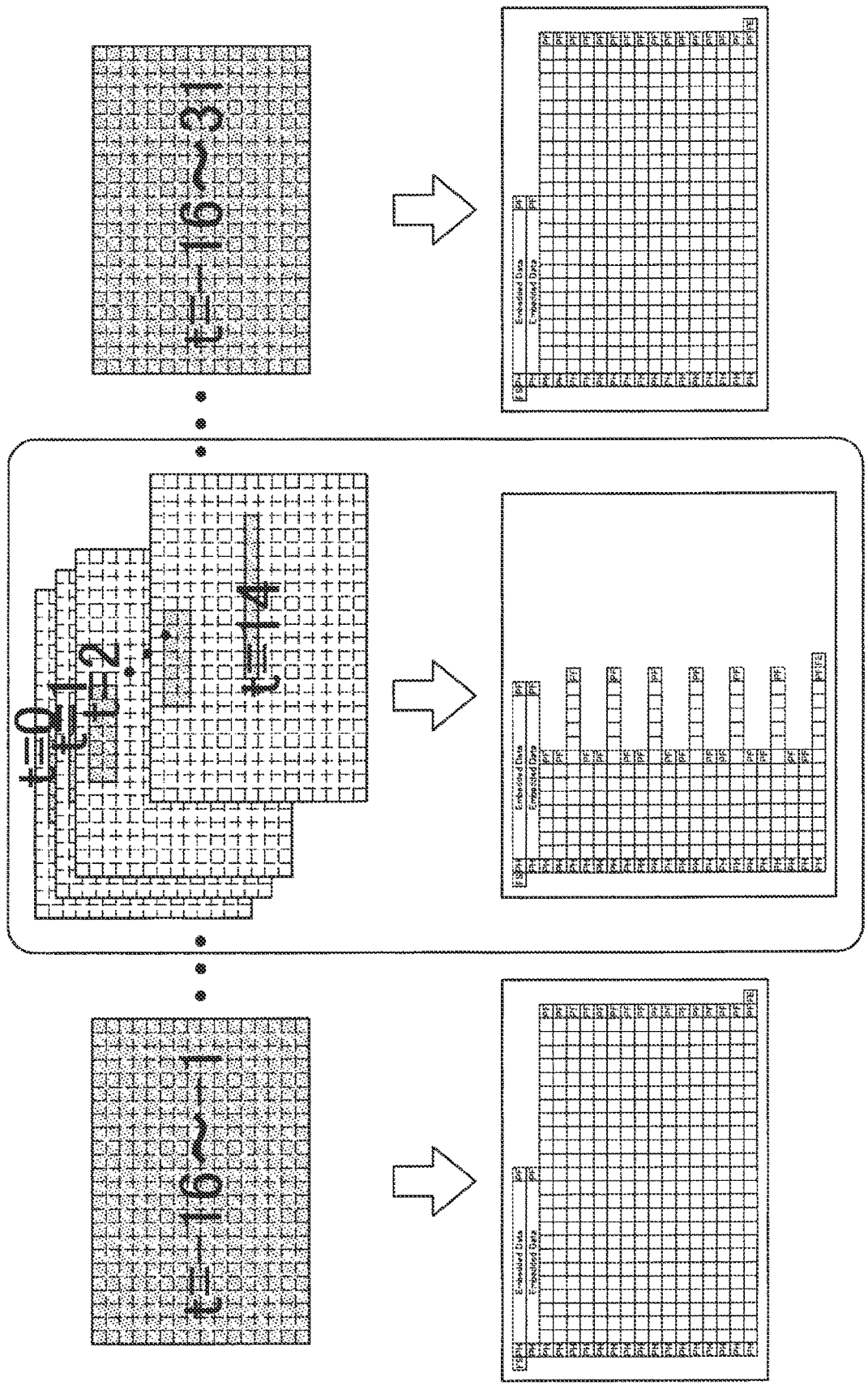
FIG. 13 is an explanatory diagram depicting another specific example of data transmitted by the image sensor 100 of the present embodiment.

FIG. 13 is an explanatory diagram depicting another specific example of data transmitted by the image sensor 100 of the present embodiment when the transmission explained above in conjunction with FIG. 12 is implemented. In the case where the image sensor 100 transmits eight images numbered 0 to 7 of the two regions found in FIG. 12, data items numbered 0 to 7 are stored in the Payload Data. This enables the image sensor 100 to transmit multiple images of a short exposure time each in the same data amount as that in the case where the whole image is transmitted.

When returning from the frames for transmitting partial regions to the frames for transmitting all regions, the image sensor 100 may use two exposure times mixedly, i.e., a short exposure time for the partial regions and a long exposure time for the regions not designated as the partial regions. By carrying out the exposure in the mixed manner, the image sensor 100 can perform an approximately uniform exposure for the whole screen starting from the first frame after the return.

Figure 14:
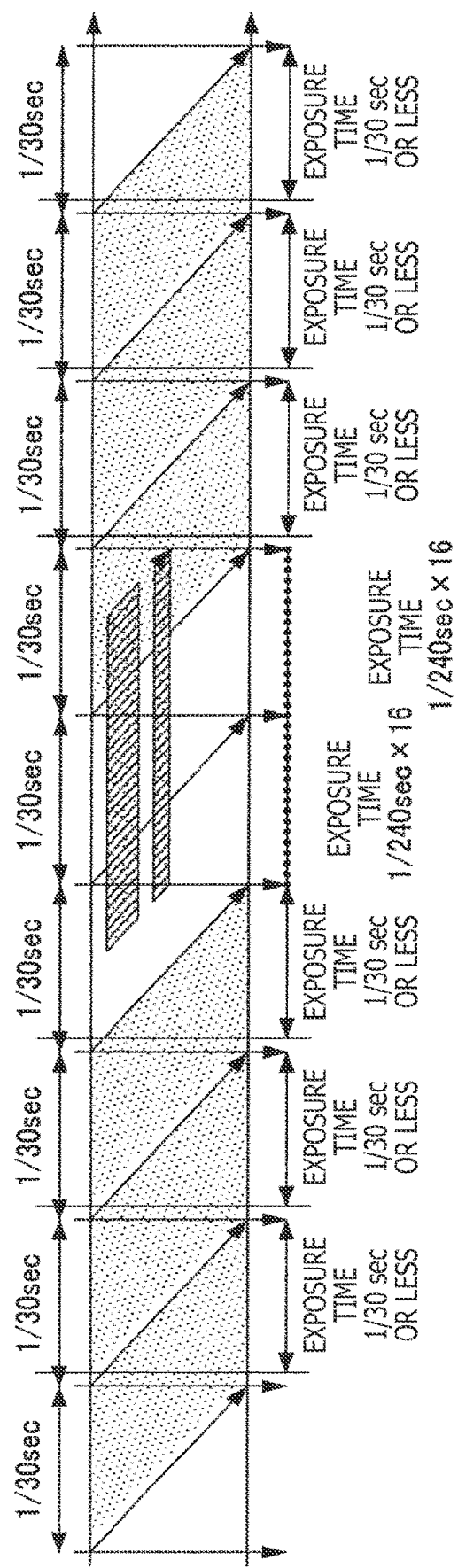
FIG. 14 is another explanatory diagram outlining the operations of the image sensor 100.

FIG. 14 is another explanatory diagram outlining the operations involved in changing the exposure time of frames in the case where only the regions set in an image are transmitted from the image sensor 100 to the processor 200. FIG. 14 depicts an example in which the exposure time is shortened (to $\frac{1}{240}$ seconds in the example of FIG. 14) for some frames and in which what are transmitted in these frames are multiple data items (8 in the example of FIG. 14) of which the vertical size and the horizontal size are $\frac{1}{8}$ and $\frac{1}{4}$ of the whole image respectively as well as multiple data items (8 in the example of FIG. 14) of which the vertical size and the horizontal size are 1/16 and 1/2 of the whole image respectively.

Here, in an (n+1)th frame, two exposure times coexist mixedly, i.e., a short exposure time for partial regions and a long exposure time for the regions not designated as the partial regions. Upon receipt of the transmission from the image sensor 100, the processor 200 combines the result of the short-time exposure for the partial regions with the result of the exposure for the remaining regions, thereby performing an approximately uniform exposure for the whole screen starting from the first frame after the return.

Figure 15:
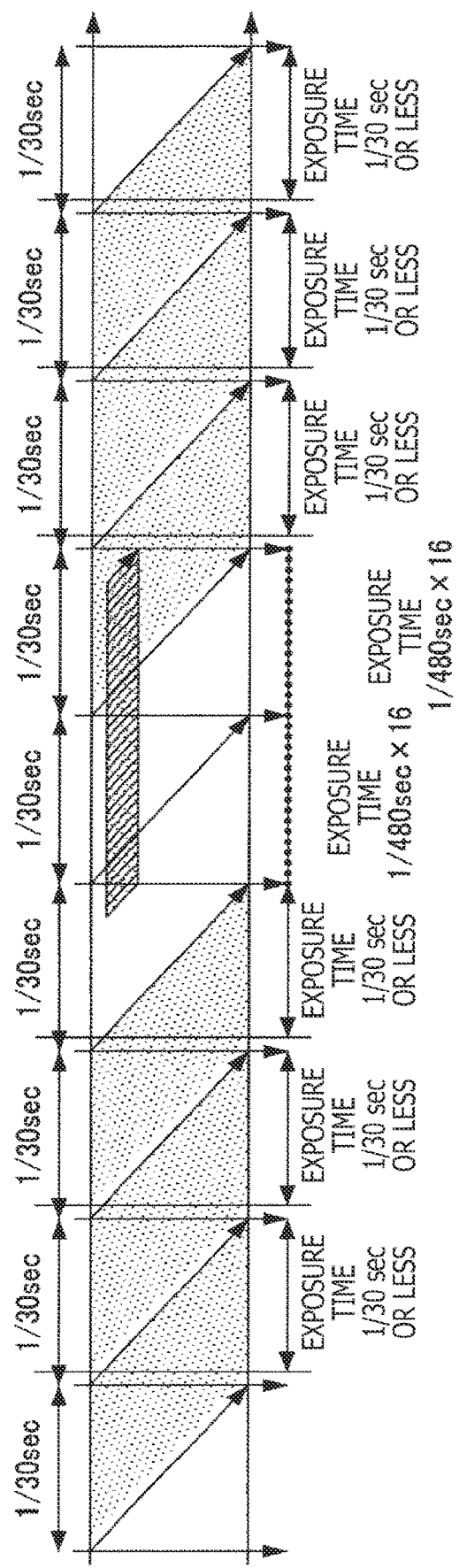
FIG. 15 is another explanatory diagram outlining the operations of the image sensor 100.

Another example is described below. FIG. 15 is another explanatory diagram outlining the operations involved in changing the exposure time of frames in the case where only the region set in an image is transmitted from the image sensor 100 to the processor 200. FIG. 15 depicts an example in which the exposure time is shortened (to 1/480 seconds the example of FIG. 15) for some frames and in which what is transmitted in these frames are multiple data items (16 in the example of FIG. 15) of which the vertical size and the horizontal size are 1/8 and 1/2 of the whole image respectively.

Also in this case, in the (n+1)th frame, two exposure times coexist mixedly, i.e., a short exposure time for a partial region and a long exposure time for the regions not designated as the partial region. Upon receipt of the transmission from the image sensor 100, the processor 200 combines the result of the short-time exposure for the partial region with the result of the exposure for the remaining regions, thereby performing an approximately uniform exposure for the whole screen starting from the first frame after the return.

Figure 16:
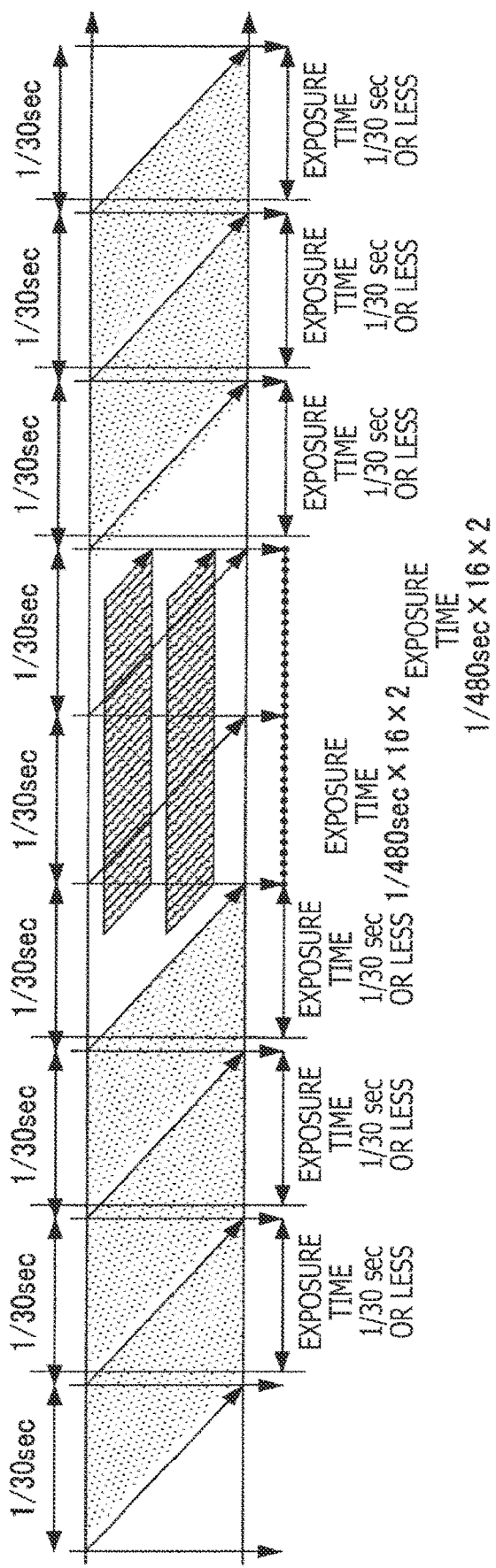
FIG. 16 is another explanatory diagram outlining the operations of the image sensor 100.

The image sensor 100 can read out multiple regions simultaneously by possessing multiple circuits each reading out data from the image sensor device 102. FIG. 16 is another explanatory diagram outlining the operations involved in changing the exposure time of frames in the case where only the regions set in an image are transmitted from the image sensor 100 to the processor 200. FIG. 16 depicts an example in which the exposure time is shortened (to 1/480 seconds in the example of FIG. 16) for some frames and in which what is transmitted in these frames are two portions of multiple data items (16 in the example of FIG. 16) of which the vertical size and the horizontal size are 1/4 and 1/8 of the whole image respectively.

The image sensor 100 can change the region to be read out in units of frames. For example, suppose that the processor 200 (or an apparatus downstream of the processor 200) detects a mobile object in a partial region of a given frame. In that case, the processor 200 (or an apparatus downstream of the processor 200) may designate for the image sensor 100 only the region that includes the mobile object, from the next frame on in order to acquire the motion of the detected mobile object in a more detailed manner.

Figure 17:
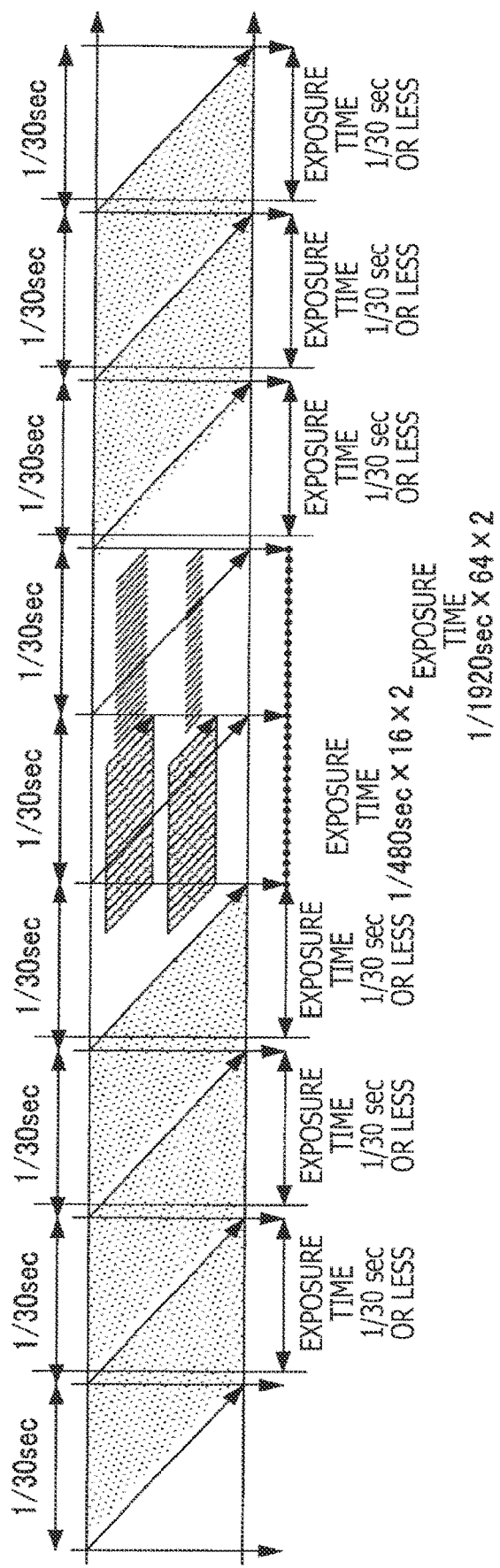
FIG. 17 is another explanatory diagram outlining the operations of the image sensor 100.

FIG. 17 is another explanatory diagram outlining the operations involved in changing the exposure time of frames in the case where only the regions set in an image are transmitted from the image sensor 100 to the processor 200. FIG. 17 depicts an example in which the exposure time is shortened (to 1/480 seconds in the example of FIG. 17) for some frames and in which what is transmitted in these frames are two portions of multiple data items (16 in the example of FIG. 17) of which the vertical size and the horizontal size are both 1/4 of the whole image.

After detecting a mobile object in a given frame, the processor 200 (or an apparatus downstream of the processor 200) instructs the image sensor 100 to further shorten the exposure time (to 1/1920 seconds in the example of FIG. 17) for the next frame. Also, the processor 200 (or an apparatus downstream of the processor 200) instructs the image sensor 100 to read from the frame an image of which the vertical size and the horizontal size are both 1/8 of the whole image as well as an image of which the vertical size and the horizontal size are 1/16 and 1/4 of the whole image respectively.

The image sensor 100 of the present embodiment of the present disclosure captures and generates a high-quality moving image of high sensitivity in the high dynamic range by carrying out the exposure of partial regions. Here, any suitable method of region designation may be adopted. For example, the processor 200 (e.g., the ROI image generation section 223) may calculate region information data constituting the region size information and transmit the result of calculation of the region information data to the image sensor 100 in order to designate the regions to be exposed. Here, the region information data may include the width, height, and coordinates of each region to be exposed.

Figure 18:
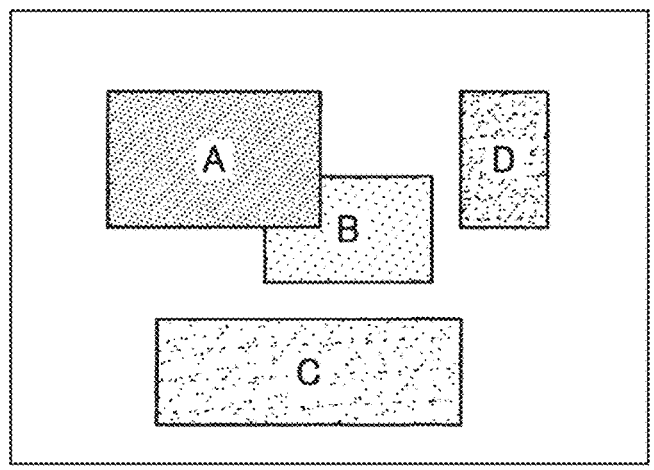
FIG. 18 is an explanatory diagram depicting an example of ROI regions.
Figure 19:
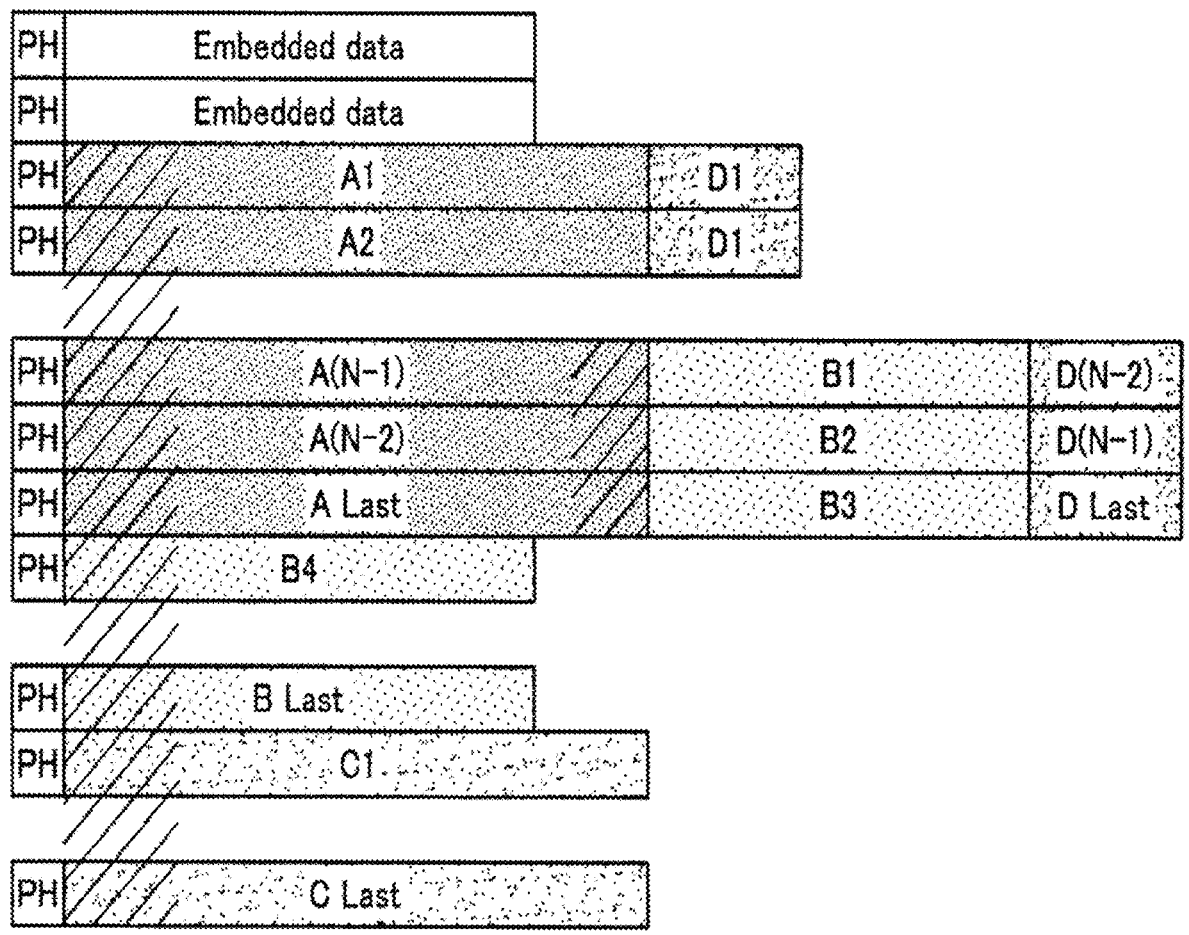
FIG. 19 is an explanatory diagram depicting an example of the data format for ROI regions.

Explained below is a typical data format for ROI regions. FIG. 18 is an explanatory diagram depicting an example of ROI regions. It is assumed, for example, that there are four ROI regions A to D as depicted in FIG. 18. FIG. 19 is an explanatory diagram depicting an example of the data format for ROI regions.

"PH" stands for a packet header. "Embedded Data" denotes data that can be embedded in packets to be transmitted. The "Embedded Data" may at least include ID identifying an ROI region, position information representing the top-left coordinates of the ROI region, and the height and width of the ROI region. In the format depicted in FIG. 19, the third and subsequent lines store the actual data of the ROI region. In the case where ROI regions overlap with each other, as in the case of regions A and B of FIG. 18, the data of an overlapping region is stored only once.

What follows is an explanation of another example of the structure of packets for use in transmitting images from the image sensor 100 (transmission apparatus) to the processor 200 (reception apparatus) in the communication system embodying the present disclosure. In the communication system of the present embodiment, the image captured by the image sensor 100 is divided into partial images in units of lines; the data of the partial image of each line is transmitted by use of at least one packet. The same applies to the region data of the regions set in the image (i.e., data of partial images with ROI set therein).

Figure 20:
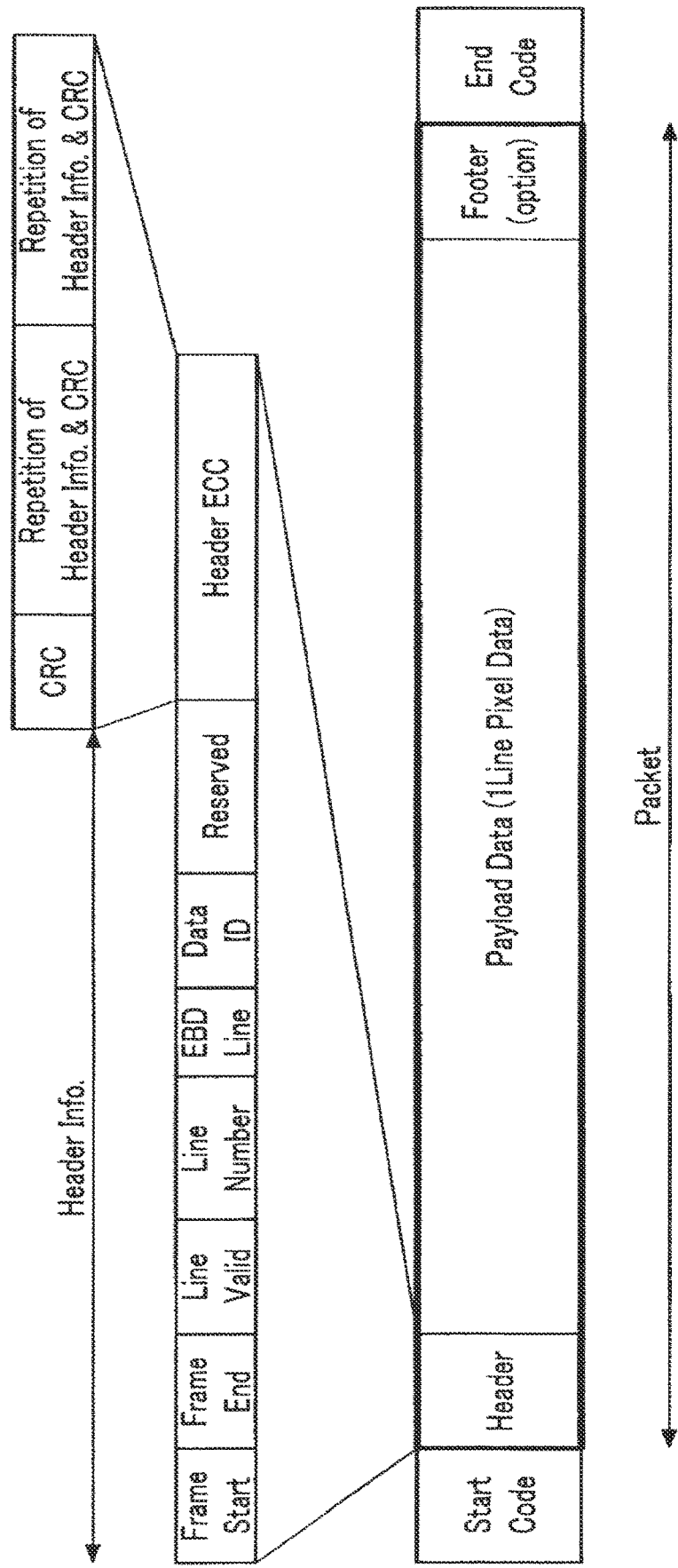
FIG. 20 is an explanatory diagram depicting a structural example of packets for use in the transmission of image data by the communication system of the present embodiment.

For example, FIG. 20 is an explanatory diagram depicting a structural example of packets for use in the transmission of image data by the communication system of the present embodiment. As depicted in FIG. 20, a packet for use in the transmission of images is defined as a series of data that starts with a Start Code and ends with an End Code in a data stream. The packet also includes a header and payload data arranged in that order. The payload data may be suffixed with a footer. The payload data (or simply referred to as the payload hereunder) includes pixel data of a partial image of each line. The header includes diverse information regarding the line corresponding to the partial image included in the payload. The footer includes additional information (option).

Explained hereunder is the information included in the header. As depicted in FIG. 20, the header includes "Frame Start," "Frame End," "Line Valid," "Line Number," "EBD Line," "Data ID," "Reserved," and "Header EC," in that order.

The Frame Start is one-bit information indicative of the start of a frame. For example, a value of 1 is set in the Frame Start of the header of a packet for use in transmitting the pixel data of the first line in the image data targeted for transmission. A value of 0 is set in the Frame Start of the header of a packet for use in transmitting the pixel data of any other line. Incidentally, the Frame Start represents an example of "information indicative of the start of a frame."

The Frame End is one-bit information indicative of the end of a frame. For example, the value 1 is set in the Frame End of the header of a packet having the payload that includes the pixel data of the end line of an effective pixel region out of the image data targeted for transmission. The value 0 is set in the Frame End of the header of a packet for use in transmitting the pixel data of any other line. Incidentally, the Frame End represents an example of "information indicative of the end of a frame."

The Frame Start and the Frame End represent an example of Frame Information which is information regarding the frame.

The Line Valid is one-bit information indicative of whether or not the line of the pixel data stored in the payload is a line of effective pixels. The value 1 is set in the Line Valid of the header of a packet for use in transmitting the pixel data of a line within the effective pixel region. The value 0 is set in the Line Valid of the header of a packet for use in transmitting pixel data of any other line. Incidentally, the Line Valid represents an example of "information indicative of whether or not the corresponding line is effective."

The Line Number is 13-bit information indicative of the line number of the line including the pixel data stored in the payload.

The EBD Line is one-bit information indicative of whether or not this is a line having embedded data. That is, the EBD Line represents an example of "information indicative of whether or not this line is a line having embedded data."

The Data ID is four-bit information for identifying each of the data items making up data (i.e., data included in the payload) in the case where the data is transferred in multiple streams. Incidentally, the Data ID represents an example of "information identifying the data included in the payload."

The Line Valid, the Line Number, the EBD Line, and the Data ID constitute Line Information which is information regarding the lines.

The Reserved is a 27-bit region for extension purposes. It is to be noted that, in the description that follows, the region indicated as Reserved may also be referred to as an "extension." The data of the header information as a whole amounts to six bytes.

As depicted in FIG. 20, a Header ECC disposed subsequent to the header information includes a CRC (Cyclic Redundancy Check) code, which is a two-byte error-detecting code calculated on the basis of the six-byte header information. That is, the Header ECC represents an example of an "error-correcting code for the information included in the header." Also, the Header ECC includes two sets of the same information as eight-byte information constituting a combination of the header information and CRC code, following the CRC code.

That is, the header of a single packet includes three combinations of the same header information and CRC code. The data amount of the entire header is 24 bytes made up of a first eight-byte combination of the header information and CRC code, a second eight-byte combination of the header information and CRC code, and a third eight-byte combination of the header information and CRC code.

Explained hereunder with reference to FIGS. 21 and 22 is an extension (Reserved) set in the header of the packet. FIGS. 21 and 22 are explanatory diagrams explaining the extension provided in the packet header.

As depicted in FIG. 21, in the extension, the first three bits are set with the type of header information (Header Info Type) corresponding to the information to be transmitted in the packet. In the extension, the header information type determines the format of the information (i.e., the format includes the information type and the position in which the information is set) to be set in the remaining 24-bit region excluding the three bits in which the header information type is set. This allows the receiving side to verify the header information type. Verification of the header information type enables the receiving side to recognize, within the extension, specific information set in specific positions outside the region in which the header information type is designated. This makes it possible to read the set information.

For example, FIG. 22 depicts how the header information type is typically set and how a variable payload length (i.e., variable line length) of the packet is typically set as one way of using the extension corresponding to the setting of the header information type. Specifically, in the example in FIG. 22, the header information type is set with the value corresponding to the case where the payload length is variable. More specifically, in the example in FIG. 22, the header information type is set with a value "001," which is different from the value "000" set for the header information type in the example in FIG. 21. That is, in this case, the header information type corresponding to the value "001" signifies the type in the case where the payload length is variable. Also in the example in FIG. 22, 14 bits in the extension are assigned to "Line Length." The "Line Length" is information for notification of the payload length. Such structure allows the receiving side to recognize that the payload length is variable, on the basis of the value set as the header information type. Also, the receiving side can recognize the payload length by reading the value set as the "Line Length" in the extension.

Explained above with reference to FIGS. 20 to 22 is one structural example of the packets for use in transmitting images from the image sensor 100 (transmission apparatus) to the processor 200 (reception apparatus) in the communication system of the present embodiment.

What follows is a description of a typical transmission method for transmitting the region data of a region (ROI) set in an image, the method being one technical feature of the communication system of the present embodiment.

The image sensor 100 stores the region data of the region set in an image into the payload of packets for line-by-line transmission. In the ensuing description, that portion of the region which is set in the image and which corresponds to each line may be referred to as a "partial region" for reasons of expediency.

(Data Format)

Figure 23:
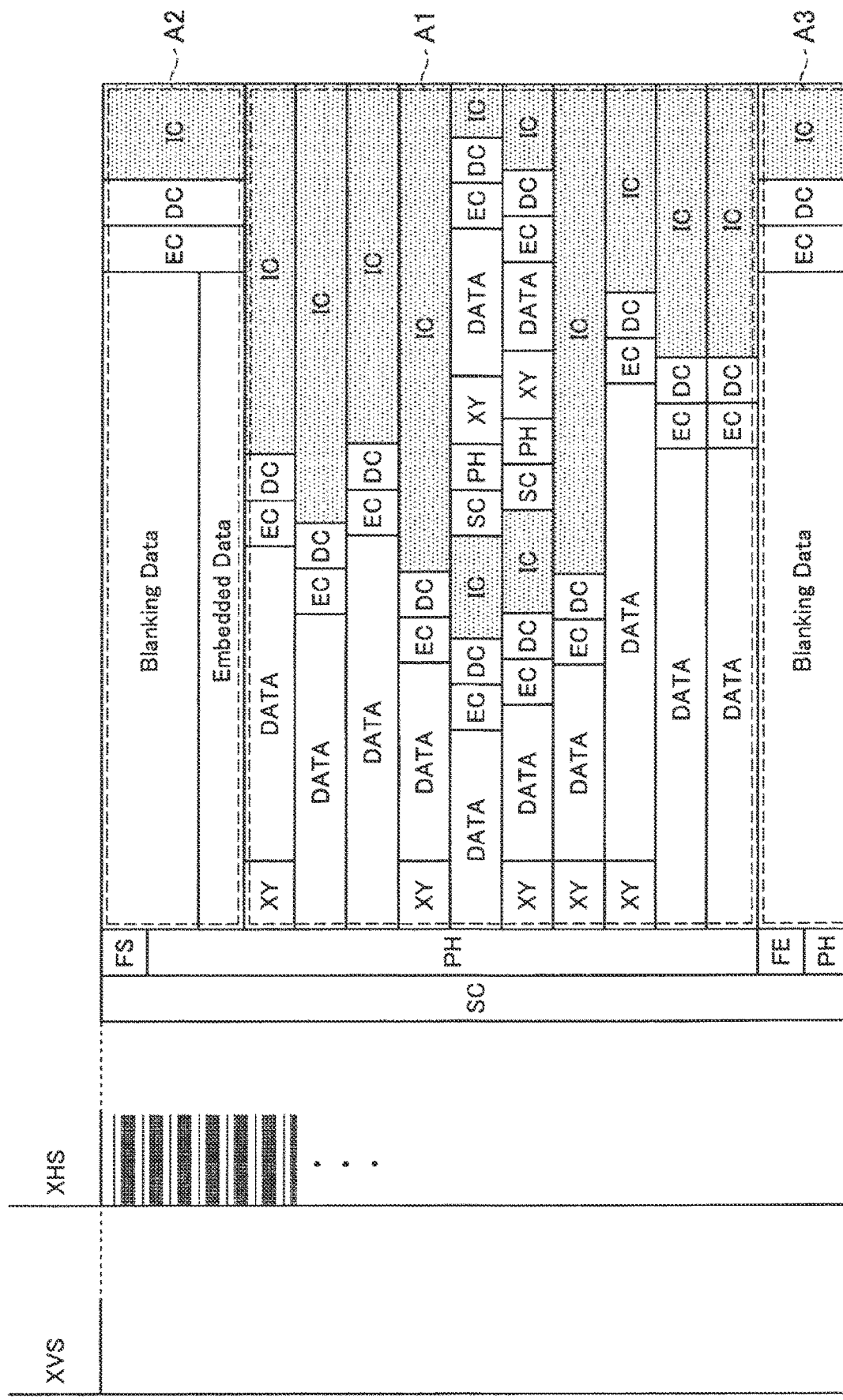
FIG. 23 is an explanatory diagram explaining the format of data for transmission.

First, FIG. 23 is an explanatory diagram explaining the format of the data for transmission. In FIG. 23, a series of packets indicated by reference sign A1 represents schematically the packets in which the region data of the region set in an image is transmitted (i.e., the packets for transmitting the data of an effective pixel region). Series of packets indicated by reference signs A2 and A3 represent the packets different from those for transmitting the region data. It is to be noted that, in the description that follows, where the packets indicated by reference signs A1, A2, and A3 are to be distinguished from one another, the packets may be referred to as "packets A1," "packets A2," and "packets A3" for reasons of expediency. That is, in the period during which the data of one frame is transmitted, a series of packets A2 is transmitted before transmission of a series of packets A1. A series of packets A3 may be transmitted after transmission of the series of packets. At least either the packets A2 or the packets A3 represent an example of "first packets." The packets A2 represent an example of "second packets."

In the example in FIG. 23, at least part of the series of packets A2 is used for transmitting the Embedded Data. For example, the Embedded Data may be stored in the payload of the packets A2 when transmitted. In another example, the Embedded Data may be stored in regions different from the payload of the packets A2 when transmitted.

The Embedded Data corresponds to additional information transmitted additionally from the image sensor 100 (i.e., the information embedded by the image sensor 100). Examples of the Embedded Data include information regarding the conditions for image capture and information regarding the regions (ROI) of which the region data is transmitted.

Although at least part of the packets A2 is used for transmitting the Embedded Data in the example in FIG. 23, the packets A2 may alternatively be replaced with at least part of the packets A3 in transmitting the Embedded Data. In the ensuing description, the Embedded Data may be referred to as "EBD."

In FIG. 23, "SC" stands for "Start Code." This is a group of symbols indicative of the start of a packet. The Start Code is prefixed to the packet. For example, the Start Code is represented by four symbols, i.e., by a combination of three K Characters K28.5, K27.7, K28.2, and K27.7.

"EC" stands for "End Code." This is a group of symbols indicative of the end of a packet. The End Code is suffixed to the packet. For example, the End Code is represented by four symbols, i.e., by a combination of three K Characters K28.5, K27.7, K30.7, and K27.7.

"PH" stands for "Packet Header." For example, the header explained above with reference to FIG. 2 corresponds to the Packet Header. "FS" denotes an FS (Frame Start) packet. "FE" denotes an FE (Frame End) packet.

"DC" stands for "Deskew Code." This is a group of symbols used for correcting Data Skew between lanes, i.e., for correcting the skewed timing of the data received by the receiving side in each lane. For example, the Deskew Code is represented by four symbols of K28.5 and Any**.

"IC" stands for "Idle Code." This is a group of symbols transmitted repeatedly in periods except during the transmission of packets. For example, the Idle Code is represented by D Character D00.0 (00000000), which is an 8B10B Code.

"DATA" denotes the region data stored in the payload (i.e., pixel data of the portions corresponding to the regions set in the image).

"XY" represents information that indicates, in X and Y coordinates, the leftmost position of the partial region (in the image) corresponding to the region data stored in the payload. It is to be noted that, in the description that follows, the X and Y coordinates represented by "XY" and indicative of the leftmost position of the partial region may simply be referred to as "XY coordinates of the partial region."

The XY coordinates of the partial region are stored at the beginning of the payload of the packets A1. In the case where there is no change in the X coordinate of the partial region corresponding to each of the continuously transmitted packets A1 and where the Y coordinate is incremented by only 1 from one packet to another, the XY coordinates of the partial region may be omitted from the subsequently transmitted packet A1. It is to be noted that this aspect of control will be discussed later using a specific example.

With this transmission method, in the case where multiple regions are set in a line in a manner separated from each other horizontally and where the region data of a partial region corresponding to each of the multiple regions is transmitted, a packet A1 for each of the multiple regions is generated separately and transmitted. That is, for each line in which two regions are set to be separated from each other horizontally, two packets A1 are generated and transmitted.

Described below with reference to FIG. 24 is a structural example of the packet header of the packet A1 for transmitting the region data of a region (ROI) set in an image, with emphasis on the structure of the extension. FIG. 24 is an explanatory diagram explaining one structural example of the packet header.

As depicted in FIG. 24, in the case where the region data of the region (ROI) set in the image is transmitted with this transmission method, the information indicating the transmission of region information is set as the header information type (i.e., information corresponding to the type targeted for transmitting the region information) in the packet header of the packet A1 used for transmitting the region data. Also, at least a portion of the extension is set with information indicative of the transmission of the region data (i.e., region data of the partial region) by use of the payload. In addition, in the case where the payload is used to transmit the region coordinates (i.e., XY coordinates of the partial region), at least a portion of the extension is set with information indicative of the transmission of the region coordinates. It is to be noted that, in the case where the region data of the region (ROI) set in the image is transmitted, the payload length of the packet A1 may vary depending on the horizontal width of the region. For this reason, as in the example explained above with reference to FIG. 22, a portion of the extension may be set with information indicative of the payload length.

2. CONCLUSION

When the communication system 1000 embodying the present disclosure is configured and operated as described above, the communication system 1000 is able to suppress the generation of motion blur, generation of saturated regions, and generation of reduced S/N ratio at the same time. By simultaneously suppressing the generation of motion blur, generation of saturated regions, and generation of reduced S/N ratio, the communication system 1000 embodying the present disclosure can capture and generate a high-quality moving image of high sensitivity in the high dynamic range.

Because the communication system 1000 embodying the present disclosure suppresses the generation of motion blur, generation of saturated regions, and generation of reduced S/N ratio simultaneously, the communication system 1000 is able to selectively shorten the exposure time solely for the region of interest in order to perform the output at a high frame rate while keeping the output data rate constant.

Because the communication system 1000 embodying the present disclosure suppresses the generation of motion blur, generation of saturated regions, and generation of reduced S/N ratio simultaneously, the communication system 1000 is able to selectively shorten the exposure time solely for the region of interest and thereby boost the frame rate by an amount reflecting the shortened exposure time while performing the output. Thus, even if the exposure time for a given frame of the image in the image sensor is shortened, so that the frame image may fall short in sensitivity when evaluated, the frame rate is boosted by an amount reflecting the shortened exposure time, which increases the number of exposed frames. This makes it possible to obtain through signal processing the image output from the image sensor with approximately the same sensitivity as in the case where the exposure time is not shortened.

For example, even if sensitivity is insufficient with an exposure time of 1/30 seconds for a conventional method and where sensitivity is insufficient with an exposure time of 1/480 seconds, the present embodiment permits acquisition of 16 images within the time of 1/30 second, each of the images being obtained with the exposure time of 1/480 seconds. The embodiment is thus able to easily reproduce the image that used to be obtained with the exposure time of 1/30 seconds, by simply adding up the 16 images each obtained with the exposure time of 1/480 seconds.

In addition, the communication system 1000 embodying the present disclosure is capable of signal processing using a relatively small number of plural images with relatively little motion blur and relatively limited motion deviation (i.e., using 16 images each obtained with the exposure time of 1/480 seconds in the above example). Since a mobile object moves in space over time (i.e., within the image), simply adding up the 16 images would reproduce the original motion blur. On the other hand, in the case where the image is acquired with the exposure time of 1/480 seconds, the difference in time between two frames is a relatively short time of 1/480 seconds in addition to the fact that each of the images is obtained with the relatively short exposure time of 1/480 seconds. It follows that the amount by which a mobile object moves between two consecutive frames is relatively small. This allows the communication system 1000 embodying the present disclosure to easily perform motion compensation on each of the mobile objects before adding up the images involved. The communication system 1000 is thus able to deal with insufficient sensitivity and motion blur at the same time.

With a conventional method, for example, even in the case of approximate exposure with the exposure time of 1/30 seconds, there may occur a partially saturated region. With the present embodiment, by contrast, 16 images each captured with the exposure time of 1/480 seconds may be obtained within the time of 1/30 seconds. When adding up the 16 images thus obtained, the communication system 1000 embodying the present disclosure maintains sufficient gradation without causing a saturation state, thereby turning the images acquired with the exposure time of 1/30 seconds easily into a high-dynamic range image with no saturation.

Some advantageous effects of the communication system 1000 embodying the present disclosure are explained below.

It is assumed that the time required to transfer the data of all pixels of the image sensor 100 to the processor 200 located downstream is a one-frame time. On this assumption, an ROI region is exposed in 1/n of the one-frame time (n is any integer of at least 2). Thus, for each image, the signal amount is 1/n times and the shot noise is $1/(n)^{1/2}$ times, worsening the S/N ratio. In a subsequent stage, however, as many as n images are added up, so that the signal amount is $1/n \times n = 1$ times and the shot noise is $((1/(n)^{1/2})^2 \times n)^{1/2} = 1$ times. The communication system 1000 embodying the present disclosure is thus able to acquire the added images without deterioration of the S/N ratio.

On the other hand, a region that has conventionally been saturated in the image following the one-frame time exposure is acquired with an exposure of 1/n times the one-frame time period. The communication system 1000 embodying the present disclosure is thus able to acquire, without saturation, subjects that are up to n times brighter.

The communication system 1000 embodying the present disclosure further provides an advantageous effect of reducing the amount of blur of a moving subject to 1/n.

In addition, by not carrying out the above-mentioned process of adding up n images in a region detected to be in motion, the communication system 1000 embodying the present disclosure is able to acquire a motionless object without worsening its S/N ratio while reducing the amount of blur of a detected mobile object to 1/n.

Moreover, the communication system 1000 embodying the present disclosure performs the adding process on the mobile object portion while carrying out motion compensation, thereby acquiring not only the motionless object but also the mobile object portion without deterioration of the S/N ratio while keeping the amount of blur of the mobile object reduced to 1/n.

Whereas the preferred embodiment of the present disclosure has been described above in detail with reference to the accompanying drawings, the embodiment is not limitative of the technical scope of the present disclosure. It is obvious that those skilled in the art will easily conceive of variations or alternatives of the disclosure within the scope of the technical idea stated in the appended claims. It is to be understood that such variations, alternatives, and other ramifications also fall within the technical scope of the present disclosure.

The advantageous effects stated in the present description are only for illustrative purposes and are not limitative of the present disclosure. That is, in addition to or in place of the above-described advantageous effects, the technology of the present disclosure may provide other advantageous effects that will be obvious to those skilled in the art in view of the above description.

For example, part or all of the constituent elements of the circuits constituting the image sensor 100 and the processor 200 needed for ROI processing and depicted in FIGS. 7 and 10 may be included either in the image sensor 100 or in the processor 200. Also, part or all of the constituent elements of the circuits making up the image sensor 100 and the processor 200 depicted in FIGS. 7 and 10 may be configured either in hardware or in software. Upon inclusion in the image sensor 100, the image sensor 100 and the processor 200 may be configured in modular form.

As another example, whereas the processor 200 configured as depicted in FIG. 10 outputs the ROI image and the normal image separately, this is not limitative of the present disclosure. Alternatively, the processor 200 may provide the ROI image and the normal image in the same output.

It is to be noted that the following configurations also fall within the technical scope of the present disclosure.

(1)

A reception apparatus including:

a reception section configured to receive image data at least either in a first mode for receiving the image data of a whole captured region or in a second mode for receiving the image data of only a partial region in the captured region; and an information processing section configured to generate an image, based on the image data received by the reception section, in which, at the time of image data receipt in the second mode, the information processing section receives image data to which a parameter different from that in the first mode is added.

(2)

The reception apparatus as stated in paragraph (1) above, in which the information processing section generates an image, by combining plural images of the image data received in the second mode, in a manner reflecting an exposure time of the image data.

(3)

The reception apparatus as stated in paragraph (2) above, in which the exposure time is determined in keeping with a size of the region at a time of data receipt in the second mode.

(4)

The reception apparatus as stated in paragraph (2) above, in which the information processing section determines the number of images to be combined of the image data received in the second mode, on the basis of information regarding the number of frames over which the second mode is continued, the information being included in the parameter.

(5)

The reception apparatus as stated in any one of paragraphs (1) to (4) above, in which the size of the region in the second mode is determined by an exposure time in the second mode and by an exposure time in the first mode.

(6)

The reception apparatus as stated in any one of paragraphs (1) to (5) above, in which the information processing section outputs information regarding a size of the region in the second mode to an imaging apparatus.

(7)

The reception apparatus as stated in any one of paragraphs (1) to (6) above, in which the information processing section uses the region read out in the second mode and any other regions than that region when generating the image in the first mode in a frame immediately following readout in the second mode.

(8)

The reception apparatus as stated in any one of paragraphs (1) to (7) above, in which the reception section receives a transmitting signal in which a payload part of a packet includes the image data and in which a predetermined header part includes the parameter.

(9)

The reception apparatus as stated in paragraph (8) above, in which the information processing section extracts region information regarding the region from the header part included in the transmitting signal received by the reception section, the information processing section further extracting, on the basis of the extracted region information, the image data of the region from the payload part included in the transmitting signal received by the reception section.

(10)

The reception apparatus as stated in paragraph (9) above, in which the region information includes information indicative of the size of the region and information indicative of the number of frames of the image transmitted in the region.

(11)

The reception apparatus as stated in paragraph (9) above, in which the reception section receives the signal according to the MIPI (Mobile Industry Processor Interface) CSI (Camera Serial Interface)-2 standard, the MIPI CSI-3 standard, or the MIPI DSI (Display Serial Interface) standard.

(12)

A transmission apparatus including:

an image processing section configured to read out image data at least either in a first mode for reading out a whole captured region or in a second mode for reading out a partial region in the captured region; and a transmission section configured to store the image data read out by the image processing section into a transmitting signal complying with a predetermined format before transmitting the image data, in which the image processing section varies a rate at which the image is to be read out in the second mode.

(13)

The transmission apparatus as stated in paragraph (12) above, in which the image processing section determines a size of the region in keeping with a frame rate at a time of readout in the second mode.

(14)

The transmission apparatus as stated in paragraph (12) above, in which the image processing section determines a frame rate in keeping with a size of the region at a time of readout in the second mode.

(15)

The transmission apparatus as stated in paragraph (12) above, in which the image processing section determines an exposure time in the second mode, based on a size of the region in the second mode and on an exposure time in the first mode.

(16)

The transmission apparatus as stated in paragraph (12) above, in which the image processing section determines a size of the region in the second mode, based on an exposure time in the second mode and on an exposure time in the first mode.

(17)

The transmission apparatus as stated in any one of paragraphs (12) to (16) above, in which the transmitting signal includes a payload part of a packet in which the image data is stored and a predetermined header part including information regarding the image data.

(18)

The transmission apparatus as stated in paragraph (17) above, in which the header part includes region information regarding the region.

(19)

The transmission apparatus as stated in paragraph (18) above, in which the region information includes information indicative of the size of the region and information indicative of the number of frames of the image transmitted in the region.

(20)

The transmission apparatus as stated in any one of paragraphs (12) to (19) above, in which the transmission section transmits the signal according to the MIPI-2 standard, the MIPI CSI-3 standard, or the MIPI DSI standard.

REFERENCE SIGNS LIST

100: Image sensor
200: Processor
1000: Communication system

The invention claimed is:

1. A reception apparatus comprising:
reception circuitry configured to receive data; and
an information processor configured to generate an image, based on image data output from the reception circuitry, wherein
the reception circuitry outputs, in a first mode, a whole captured region as the image data and outputs, in a second mode, a partial region in the captured region as the image data, the reception circuitry selecting among the first mode and the second mode on a basis of additional information included in the image data, the selecting among the first mode and the second mode being automatically performed in an absence of a user selection of a region.

2. The reception apparatus according to claim 1, wherein the information processor generates the image by combining plural images of the image data received in the second mode.

3. The reception apparatus according to claim 2, wherein the information processor determines the number of images to be combined of the image data received in the second mode.

4. The reception apparatus according to claim 1, further comprising:
transmission circuitry configured to transmit region information data to an imaging apparatus, wherein the information processor generates the region information data, by determining the partial region to be acquired of the captured region, based on the image generated in the first mode.

5. The reception apparatus according to claim 4, wherein the size of the region in the second mode is determined by an exposure time in the second mode and by an exposure time in the first mode.

6. The reception apparatus according to claim 1, wherein the information processor generates information representing coordinates and the size of the region in the second mode as the region information data, the information processor further supplying the generated information to the reception circuitry.

7. The reception apparatus according to claim 1, wherein the information processor uses the region read out in the second mode and any other regions than that region when generating the image in the first mode in a frame immediately following readout in the second mode.

8. The reception apparatus according to claim 1, wherein the reception circuitry receives a transmitting signal in which a payload part of a packet includes the image data and in which a predetermined header part includes the additional information.

9. The reception apparatus according to claim 8, wherein the information processor extracts region information regarding the region from the header part included in the transmitting signal received by the reception circuitry, the information processing circuitry further extracting, on a basis of the extracted region information, the image data of the region from the payload part included in the transmitting signal received by the reception circuitry.

10. The reception apparatus according to claim 9, wherein the region information includes information indicative of the size of the region and information indicative of the number of frames of the image transmitted in the region.

11. The reception apparatus according to claim 8, wherein the reception circuitry receives the signal according to the MIPI (Mobile Industry Processor Interface) CSI (Camera Serial Interface)-2 standard, the MIPI CSI-3 standard, or the MIPI DSI (Display Serial Interface) standard.

12. A non-transitory computer readable medium storing program code, the program code being executable by a processor to perform operations comprising:
generating an image based on image data; and
selecting among a first mode and a second mode, wherein in the first mode, a whole captured region is output as the image data and, in the second mode, a partial region in the captured region is output as the image data, and
selecting among the first mode and the second mode is on a basis of additional information included in the image data, the selecting among the first mode and the second mode being automatically performed in an absence of a user selection of a region.

13. The non-transitory computer readable medium according to claim 12, wherein the operations further comprise:
generating the image by combining plural images of the image data received in the second mode.

14. The non-transitory computer readable medium according to claim 13, wherein the operations further comprise:
determining the number of images to be combined of the image data received in the second mode.

15. The non-transitory computer readable medium according to claim 12, wherein the operations further comprise:
transmitting region information data to an imaging apparatus; and
generating the region information data, by determining the partial region to be acquired of the captured region, based on the image generated in the first mode.

16. The non-transitory computer readable medium according to claim 15, wherein the size of the region in the second mode is determined by an exposure time in the second mode and by an exposure time in the first mode.

17. The non-transitory computer readable medium according to claim 15, wherein the operations further comprise:
generating information representing coordinates and the size of the region in the second mode as the region information data.

18. The non-transitory computer readable medium according to claim 12, wherein the operations further comprise:
using the region read out in the second mode and any other regions than that region when generating the image in the first mode in a frame immediately following readout in the second mode.

19. The non-transitory computer readable medium according to claim 12, wherein the operations further comprise:
receiving a transmitting signal in which a payload part of a packet includes the image data and in which a predetermined header part includes the additional information.

20. The non-transitory computer readable medium according to claim 19, wherein the operations further comprise:
extracting region information regarding the region from the header part included in the transmitting signal; and
extracting, on a basis of the extracted region information, the image data of the region from the payload part included in the transmitting signal.

* * * * *